US008773360B2

(12) United States Patent
Uchida et al.

(10) Patent No.: US 8,773,360 B2
(45) Date of Patent: Jul. 8, 2014

(54) DISPLAY DEVICE, TWO-WAY COMMUNICATION SYSTEM AND DISPLAY INFORMATION USING METHOD

(75) Inventors: Mami Uchida, Saitama (JP); Ayumi Mizobuchi, Tokyo (JP); Tamao Katayama, Tokyo (JP); Yuki Kitamura, Tokyo (JP); Kenichirou Matsumura, Tokyo (JP); Miwako Yoritate, Tokyo (JP)

(73) Assignee: Sony Corporation, Tokyo (JP)

( * ) Notice: Subject to any disclaimer, the term of this patent is extended or adjusted under 35 U.S.C. 154(b) by 1059 days.

(21) Appl. No.: 10/990,580

(22) Filed: Nov. 17, 2004

(65) Prior Publication Data
US 2005/0184968 A1 Aug. 25, 2005

(30) Foreign Application Priority Data
Nov. 19, 2003 (JP) .................................. 2003-388715

(51) Int. Cl.
*G06F 3/041* (2006.01)
(52) U.S. Cl.
USPC ........... 345/173; 715/700; 715/788; 715/798; 715/800; 725/40
(58) Field of Classification Search
USPC ............. 345/87, 173–176, 169, 158, 2.1, 2.2, 345/2.3, 629, 660; 715/700, 517–521, 788, 715/798, 800; 725/131–133, 80–81, 40, 725/43–44, 139, 141; 455/557, 3.06
See application file for complete search history.

(56) References Cited

U.S. PATENT DOCUMENTS

| | | | | | |
|---|---|---|---|---|---|
| 5,651,109 | A | * | 7/1997 | Glasser et al. | 345/522 |
| 5,732,230 | A | * | 3/1998 | Cullen et al. | 715/764 |
| 5,767,919 | A | * | 6/1998 | Lee et al. | 725/37 |
| 6,169,568 | B1 | * | 1/2001 | Shigetomi | 725/76 |
| 6,469,633 | B1 | * | 10/2002 | Wachter | 340/4.37 |
| 6,559,813 | B1 | * | 5/2003 | DeLuca et al. | 345/8 |
| 6,822,698 | B2 | * | 11/2004 | Clapper | 348/734 |

(Continued)

FOREIGN PATENT DOCUMENTS

| JP | A 10-294907 | 11/1998 |
|---|---|---|
| JP | A 2001-268468 | 9/2001 |

(Continued)

OTHER PUBLICATIONS

Japanese Office Action dated Jul. 15, 2009.

*Primary Examiner* — Jason Mandeville
(74) *Attorney, Agent, or Firm* — Frommer Lawrence & Haug LLP; William S. Frommer; Ellen Marcie Emas

(57) ABSTRACT

Even in the case of displaying operation display information, an image to be displayed on a display screen is prevented from being difficult to see, and an operation input by using the operation display information is always appropriately conducted. A display device receives an information signal from a base device, and displays main display information that is an image derived from a display signal of the information signal on an LCD. In the case where the display device displays a control panel for accepting an operation input from a user on the LCD, the display device controls a size change processor so that a size and a position of display of the main display information is so changed as not to overlap with display of the control panel.

8 Claims, 13 Drawing Sheets

(56) References Cited

U.S. PATENT DOCUMENTS

| | | | |
|---|---|---|---|
| 7,222,306 B2* | 5/2007 | Kaasila et al. | 715/801 |
| 7,376,909 B1* | 5/2008 | Coyle | 715/778 |
| 2002/0054028 A1* | 5/2002 | Uchida et al. | 345/173 |
| 2003/0025676 A1* | 2/2003 | Cappendijk | 345/173 |
| 2003/0056215 A1* | 3/2003 | Kanungo | 725/38 |
| 2003/0197687 A1* | 10/2003 | Shetter | 345/173 |
| 2004/0090424 A1* | 5/2004 | Hurley et al. | 345/169 |
| 2004/0130576 A1* | 7/2004 | Fujita et al. | 345/781 |

FOREIGN PATENT DOCUMENTS

| | | | |
|---|---|---|---|
| JP | A 2002-034023 | | 1/2002 |
| JP | 2002055750 A | * | 2/2002 |
| JP | A 2003-087673 | | 3/2003 |
| JP | A 11-266413 | | 9/2009 |

* cited by examiner

F I G. 5
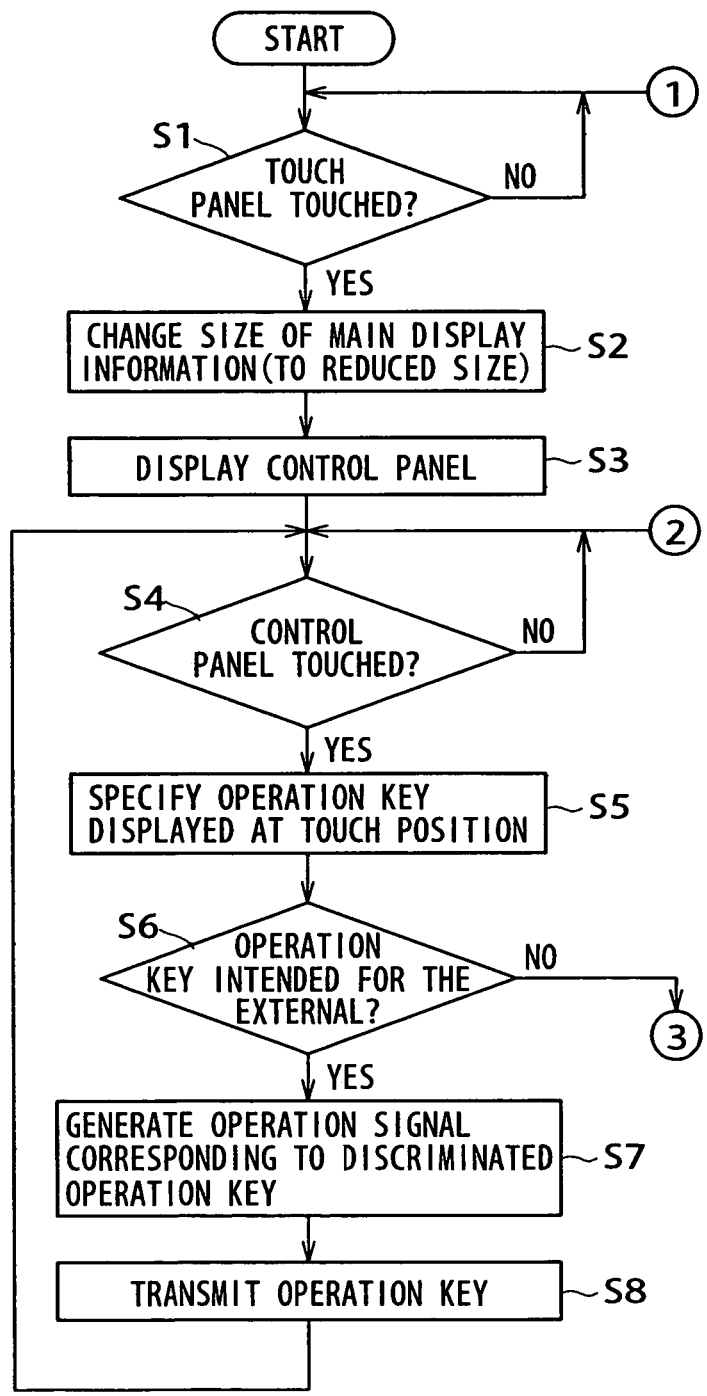

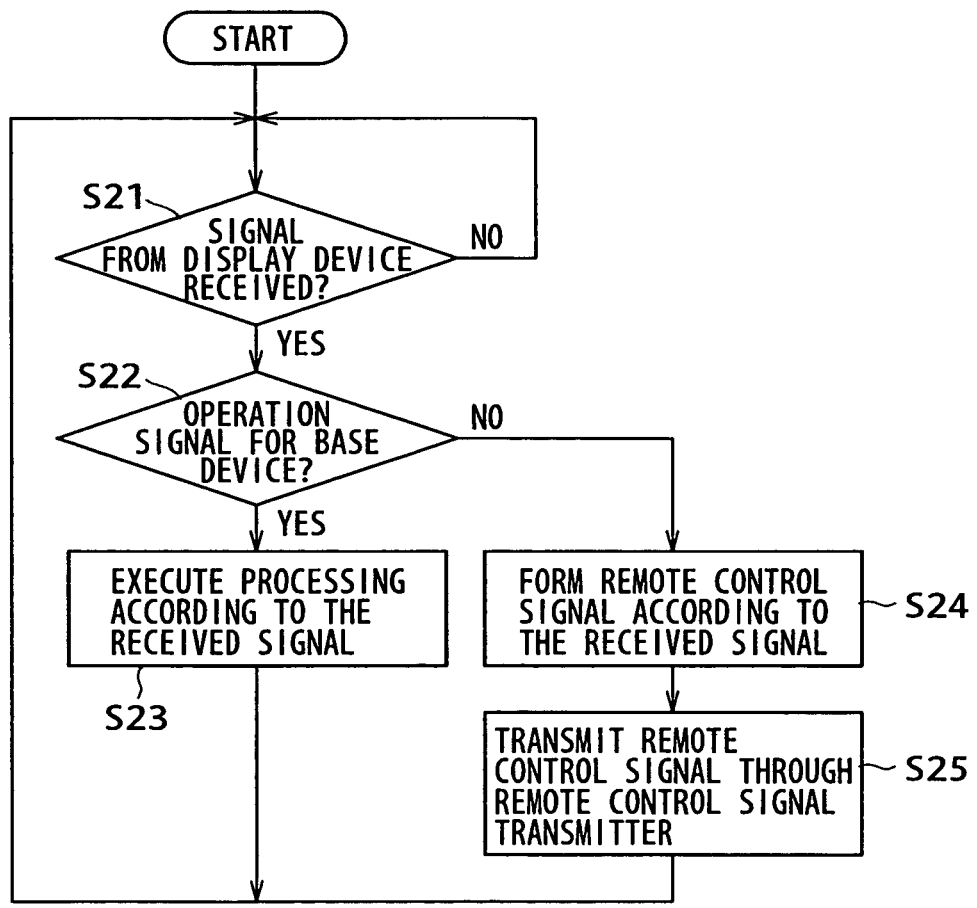
F I G. 7

F I G. 8
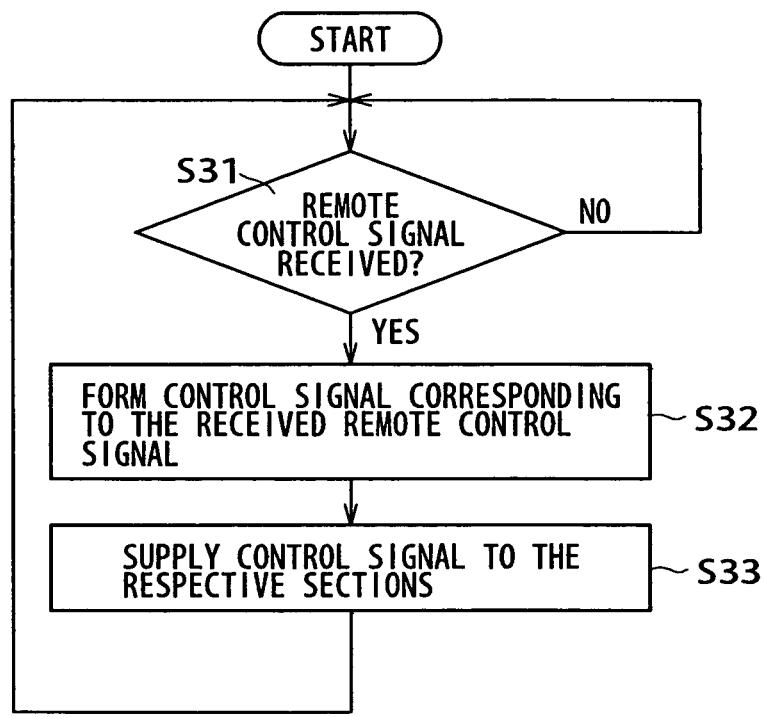

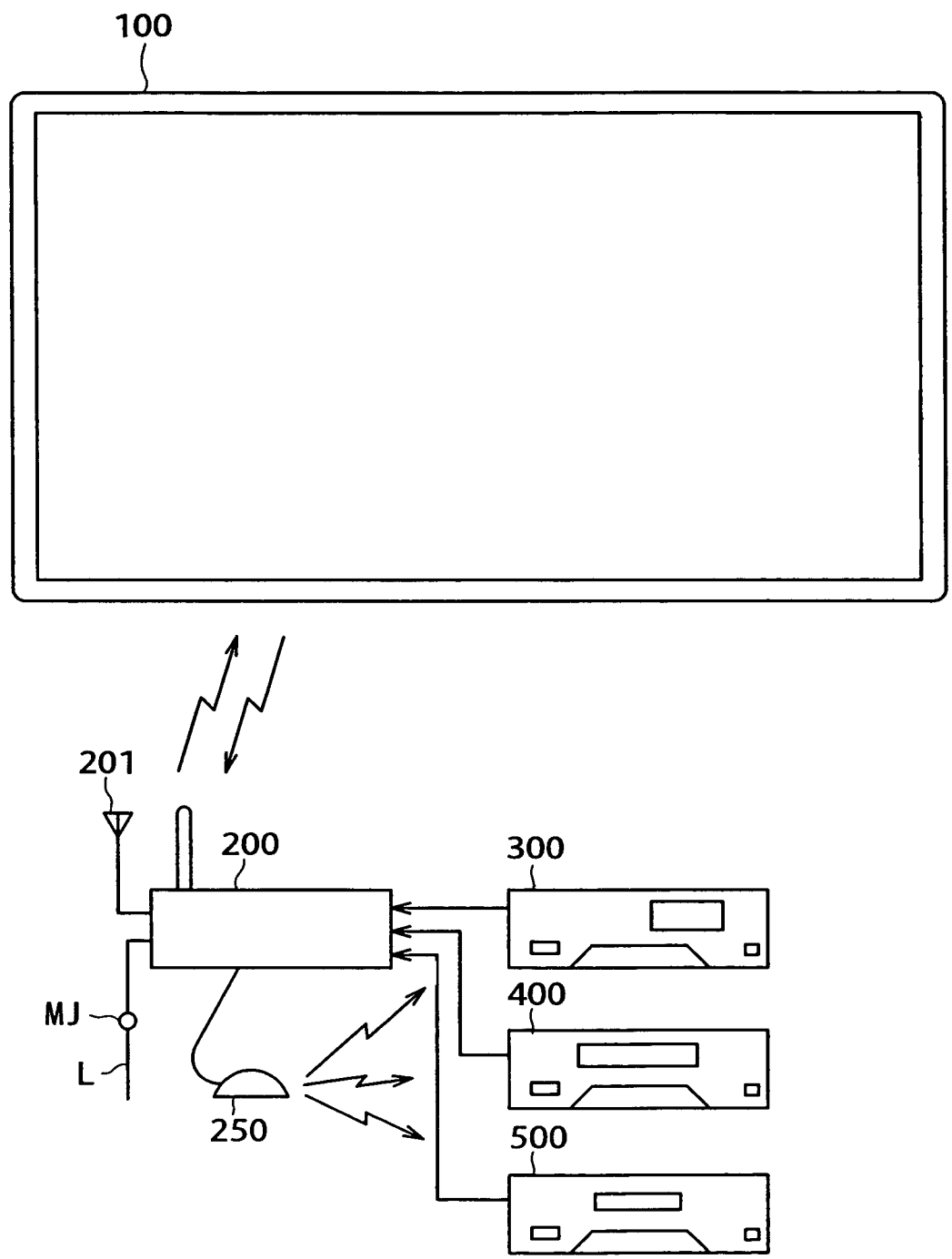
F I G. 9

DISPLAY DEVICE, TWO-WAY COMMUNICATION SYSTEM AND DISPLAY INFORMATION USING METHOD

BACKGROUND OF THE INVENTION

Field of the Invention

The present invention relates to a display device having a function of receiving various operation inputs from a user, a two-way communication system providing the display device having the function of receiving various operation inputs from a user, and a display information using method used in the system.

There is now provided a display device such as a television receiver which is thinned and lightened in weight by using an LCD (liquid crystal display) or the like, so as to be portable and used within the reach of a user. The display device of this type does not require a remote commander (hereinafter referred to as "remote controller") which is a remote controller.

Also, it is troublesome to operate external input devices such as an STB (set-top box) that supplies a video signal or an audio signal to the display device, a satellite receiver that is called "IRD (integrated receiver decoder)", a VTR (video tape recorder), or a DVD (digital versatile disc) recorder by using remote controllers of the respective external input devices.

Under the above circumstances, JP2002-34023A has proposed a display device, a base device and a two-way communication system having the display device and the base device which are constituted, respectively, as follows: The display device has a function of the remote controller having a touch panel on a display screen of the display device, receiving an operation input from a user by means of operation display information displayed on the display screen and the touch panel, and allowing a remote control signal corresponding to the received operation input to be formed and sent. The base device supplies an information signal such as a video signal to the display device and is connected with an external input device such as a VTR or a DVD recorder. The two-way communication system has the display device and the base device each having the above structure.

SUMMARY OF THE INVENTION

However, in the case of using the technique disclosed in JP 2002-34023A, an image displayed on the entire display screen of the display device may hide behind the operation display information to make it difficult to see important information. In particular, there is a case in which the image displayed on the entire display screen of the display device is, for example, information including a large amount of character information such as recording history information from the DVD recorder or an EPG (electronic program guide) from the STB or the IRD. In this case, it may be hard to accurately comprehend the display information.

For example, there is a case in which the recording history information from the DVD recorder is displayed on the entire display screen of an LCD 1 onto which a touch panel 2 is attached as shown in FIG. 13A. In this case, when a control panel PX that is the operation display information for the DVD recorder is displayed, it is hard to see a part of the recording history information, thereby making it hard to select desired information.

Also, there is a case in which the EPG from the STB or the IRD is displayed on the entire display screen of the LCD 1 onto which the touch panel 2 is attached as shown in FIG. 13B. In this case, when a control panel PY that is the operation display information for the STB or the IRD is displayed, it is hard to see a part of the EPG, thereby making it hard to select a desired program.

In view of the above, an object of the present invention is to provide a device, a system and a method which prevent information displayed on a display screen from being hard to see so that an operation input using operation display information can always be appropriately conducted even in the case where the operation display information is displayed.

In order to achieve the above object, according to a first aspect of the present invention, there is provided a display device, comprising:

receiving means for receiving an information signal;
a display element for displaying an image corresponding to a display signal of the information signal that is received from the receiving means;
operation display processing means for displaying operation display information for receiving an operation input from a user on the display element;
adjusting means for adjusting at least a size of the image corresponding to the display signal of the information signal from the receiving means according to the operation display information so that the image is displayed on the display element;
touch position detecting means disposed on a display screen of the display element for detecting a touch position on the display screen which is touched by the user; and
control means for conducting processing corresponding to a display item of the operation display information which is displayed at the touch position on the display screen which is detected by the touch position detecting means.

According to the display device of the first aspect of the present invention, the image corresponding to the display signal of the information signal that is received by the receiving means is displayed on the display element. Also, the operation display information is displayed on the display element by the operation display processing means. Then, in the case where the operation display information is displayed, the size of the image to be displayed on the display element according to the display signal of the information signal is adjusted by the adjusting means.

That is, in the case where the operation display information is displayed on the display element, the image corresponding to the display signal of the received information signal is reduced so that the operation display information does not overlap with the image corresponding to the display signal of the received information signal. Then, the function of receiving the operation input from the user is realized by the operation display information and the touch position detecting means. Processing can be conducted according to the operation input from the user which is received through the receiving function under the control of the control means.

With the above structure, even in the case where the operation display information is displayed on the display element, all of the information from the image corresponding to the display signal is appropriately supplied to the user. Then, the instruction input is received from the user through the operation display information and the touch position detecting means, and processing can be conducted according to the instruction input.

Also, according to a second aspect of the present invention, there is provided the display device according to the first aspect, further comprising:

forming means for forming a remote control signal with respect to another electronic device which corresponds to the display item of the operation display information which is displayed at the touch position on the display screen which is detected by the touch position detecting means; and transmitting means for transmitting the remote control signal formed by the forming means.

According to the display device of the second aspect of the present invention, the function of receiving the operation input from the user is realized by the operation display information and the touch position detecting means. The remote control signal corresponding to the operation input from the user which is received through the operation display information and the touch position detecting means is formed by the forming means. The formed remote control signal is transmitted through the transmitting means.

This makes it possible to add the function of the remote controller to the image display device and to remotely control an electronic device that is a supplier of the information signal such as a video signal which is supplied to the display device. Moreover, even in the case where the operation display information is displayed, the image derived from the display signal of the received information signal is prevented from being difficult to see.

According to the present invention, even in the case where the operation display information is displayed on the display screen of the display element, the image derived from the display signal of the received information signal can be reduced and displayed so as not to overlap with the operation display information. As a result, the use can input an appropriate instruction input without fail while confirming all of the display information which is displayed on the display screen of the display element.

Also, the size of the image derived from the display signal of the received information signal is automatically adjusted according to display or non-display of the operation display information. As a result, it is unnecessary for the user to conduct such troublesome work as instructing the size of the image derived from the display signal of the received information signal each time.

BRIEF DESCRIPTION OF THE DRAWINGS

These and other objects, features and advantages of the present invention will become more apparent upon consideration of the following description of the preferred embodiments of the present invention taken in conjunction with the accompanying drawings.

FIG. 5 is a flowchart for explaining processing that is conducted in the display device shown in FIG. 2;

FIG. 7 is a flowchart for explaining processing that is conducted in the base device shown in FIG. 3;

FIG. 8 is a diagram for explaining processing that is conducted in the DVD device shown in FIG. 4;

FIG. 9 is a diagram for explaining an example in which a plurality of external input devices are connected to the base device;

DETAILED DESCRIPTION OF THE PREFERRED EMBODIMENTS

Now, a device, a system and a method according to an embodiment of the present invention will be described with reference to the accompanying drawings.

[Outline of Two-Way Communication System]

Figure 1:
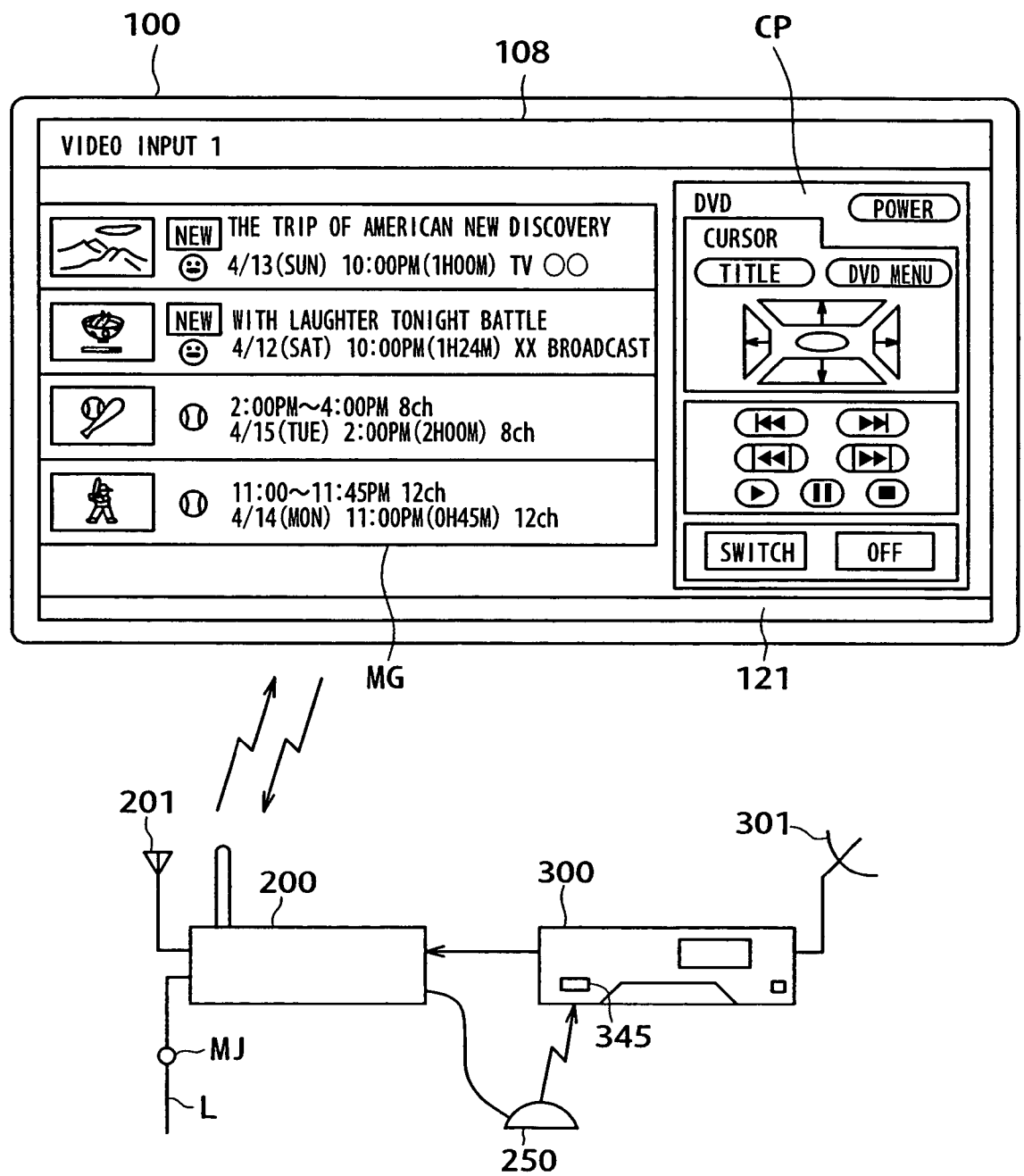
FIG. 1 is a diagram for explaining a two-way communication system in accordance with an embodiment of the present invention.

FIG. 1 is a diagram for explaining a two-way communication system according to this embodiment, to which the system and the method according to the present invention are applied. As shown in FIG. 1, the two-way communication system according to this embodiment is made up of a display device 100, a base device (base station) 200, and a DVD device (DVD recorder) 300 as an external input device.

The display device 100 is a display device to which the present invention is applied, and has an LCD 108 as the display element. The display device 100 is connected to the base device 200 through a radio communication so as to receive the information signal from the base device 200 and also to transmit a control signal to the base device 200.

The base device 200 is connected to an antenna 201 that receives an analog terrestrial television signal, and includes a tuner that tunes in to the analog terrestrial television signal as will be described later. The base device 200 also includes a communication processor such as a modem or a terminal adaptor for connection to a communication network such as a telephone network or the Internet, so as to be connected to the telephone network or the Internet through a telephone line L. In FIG. 1, a terminal MJ is a joining terminal for the telephone line L that is led out of the external.

Also, the base device 200 includes an external input terminal as will be described later, so as to be connected with various external input devices such as a DVD device, a VTR, an STB or an IRD. In this embodiment, as shown in FIG. 1, the base device 200 is connected with the DVD device 300 as the external input device.

Then, the base device 200 tunes to the analog television signal in by means of its tuner. The base device 200 then compresses an information signal such as a video signal or an audio signal of a television program which is obtained by demodulation, or video data or audio data that is obtained from the communication network through its communication processor, or the video signal or the audio signal from the DVD device 300, forms a transmitting signal and transmits the transmitting signal to the display device 100.

The display device 100 receives the transmitting signal from the base device 200, demodulates the transmitting signal, and extracts the video signal and a display signal such as text data from the demodulated transmitting signal. Then, the display device 100 displays an image corresponding to the display signal on an LCD 108, extracts the audio signal from the demodulated transmitting signal, and sounds a voice corresponding to the audio signal from a speaker.

Also, as shown in FIG. 1, the display device 100 is so designed as to display a control panel CP which is operation display information for receiving an operation input made to control the DVD device 300 on the LCD 108. Then, a touch panel 121 is attached onto the LCD 108 as will be described later, and can receive the operation input from the user by means of the display of the control panel CP and the touch panel 121.

The control panel CP for the DVD device 300 is a so-called software key which is displayed by software to be executed by a control section of the display device 100. In this embodiment, in a state where the operation display information such as the control panel CP is not displayed on the display screen of the LCD 108, when a user's finger or the like is brought in contact with the touch panel 121 that is attached onto the display screen of the LCD 108, the control panel CP is displayed. Also, when the finger is brought in contact with a predetermined operation key portion on the displayed control panel CP, the control panel CP that is displayed on the display screen can be erased, or another control panel can be displayed.

In this embodiment, as shown in FIG. 1, the control panel CP is used for the DVD device 300. In this example, as shown in FIG. 1, the control panel CP is provided with various operation keys such as an on/off key of a power supply, a title key, a DVD menu key, arrow keys (an up arrow key, a down arrow key, a right arrow key, a left arrow key), a decision key, a backward skip key, a forward skip key, a fast rewind key, a fast forward key, are production key, a pause key, a stop key, a device change key, and a display off key of the control panel.

Also, a layout of the operation keys of the control panel for the DVD device shown in FIG. 1 is shown as one example, and various layouts can be taken. Accordingly, it is possible to form and display a control panel having more operation keys arranged other than the control panel CP shown in FIG. 1. Alternatively, it is possible to form and display the control panel having only a minimum of operation keys.

Then, the display device 100 detects the touch position (coordinate position) on the touch panel 121 that is attached onto the LCD 108 with which the user's finger was in contact, discriminates the operation key (display item) of the control panel CP which is displayed at the touched position, and moves the display position of a cursor. Alternatively, the display device 100 forms an operation signal corresponding to the operation key which is touched, and transmits the operation signal to the base device 200 by radio.

That is, the control panel CP for the DVD and the touch panel 121 according to this embodiment function as a GUI (graphical user interface) for receiving an instruction input to the display device 100 and an instruction input to the DVD device 300.

As shown in FIG. 1, the base device 200 is connected with a remote control signal transmitter 250 through a joining terminal for connection to the remote control signal transmitter 250. The remote control signal transmitter 250 generates a remote control signal corresponding to the operation signal from the display device 100, and then transmits the remote control signal to the DVD device 300.

The DVD device 300 originally has a remote control signal photoreceiver 345 such as a photodetector for optically receiving an infrared remote control signal from a remote controller of the DVD device 300. Upon receiving the remote control signal from the remote control signal transmitter 250 that is connected to the base device 200, the remote control signal photoreceiver 345 performs the remote control so as to conduct control according to the remote control signal. For example, the remote control signal photoreceiver 345 conducts the on/off operation of a power supply, or the reproduction, fast rewind or fast forwarding of intended contents which have been recorded in the DVD, or the pause or stop of those operation.

Accordingly, the user can move a cursor position by conducting the operation input that instructs the movement of the displayed cursor through the control panel CP that is displayed on the LCD 108 of the display device 100, and the touch panel 121 in a so-called one-touch operation manner. Alternatively, the user can remotely controls the DVD device through the base device 200 by conducting the operation input with respect to the DVD device 300 in the so-called one-touch operation manner.

As described above, it is possible to conduct two-way radio communication between the display device 100 and the base device 200. Also, it is possible to conduct two-way communication between the base device 200 and the DVD device 300 as the external input device.

Since the display device 100 is downsized and lightened in weight and also connected to the base device 200 by a radio communication, the display device 100 is suitable for carry. For that reason, when the user carries the display device 100 within an area that can communicate with the base device 200, the user can reproduce and output the information signal that is supplied from the base device 200 so as to provide the information by means of the display device 100 everywhere.

Accordingly, as described above, the user can watch a television program which is tuned in by the tuner of the base device 200, or watch the contents that have been recorded in the DVD loaded in the DVD device 300 by means of the display device 100. Also, in the case where the base device 200 is connected with a VTR, an STB or an IRD as an external input device, the user can watch the contents from the VRT, the STB or the IRD.

Also, the user can acquire through the communication processor of the base device 200 information of a so-called web page that is provided on the Internet and watch the information of the web page by means of the display device 100. Also, the user can receive e-mail addressed to the user and watch the e-mail displayed on the LCD 108 by means of the display device 100. Further, the user can prepare and transmit an e-mail to an intended third party by means of the display device 100.

In the case of preparing the e-mail, the user conducts predetermined operation with respect to the display device 100 so as to display on the LCD 108 a software keyboard consisting of, for example, alphabet keys, the Japanese syllabary and so on, and prepare the e-mail through the software keyboard and the touch panel 121. Then, the user conducts predetermined operation, of example, operates the transmission key, thereby making it possible to transmit the prepared e-mail to the base device 200 and transmit the e-mail to the third party through the base device 200.

As described above, the base device 200 is so designed as to connect an external input device such as the DVD device 300, various information transmission mediums such as a communication network, for example, a terrestrial television broadcast or an Internet, and the display device 100. Then, upon receiving the information signal from the base device 200, the display device 100 reproduces and outputs the information signal for supply to the user. The display device 100 also forms the transmission information such as the e-mail and transmits the transmission information through the base device 200.

Then, in the display device 100 according to this embodiment, when the operation display information such as the control panel CP is displayed, main display information MG is reduced in size and displayed so as not to make it difficult to see the main display information MG as described with respect to FIG. 12. In the example shown in FIG. 1 the main display information MG is record history information related to the DVD that is loaded in the DVD device 300, and is to be originally displayed on the entire display screen of the LCD 108. However, the main display information MG is reduced in size and displayed in order to prevent the display area of the main display information MG from overlapping that of the control panel CP.

As will be described later, the main display information is not limited to the record history information of the DVD. For example, in the case where the control panel such as the image of the television program or the EPG (electronic program listing) is not displayed, the main display information is displayed on the entire display screen of the LCD 108 and supplied to the user. Accordingly, the control panel is regarded as so-called auxiliary display information which is displayed as required.

[Display Device 100]

Figure 2:
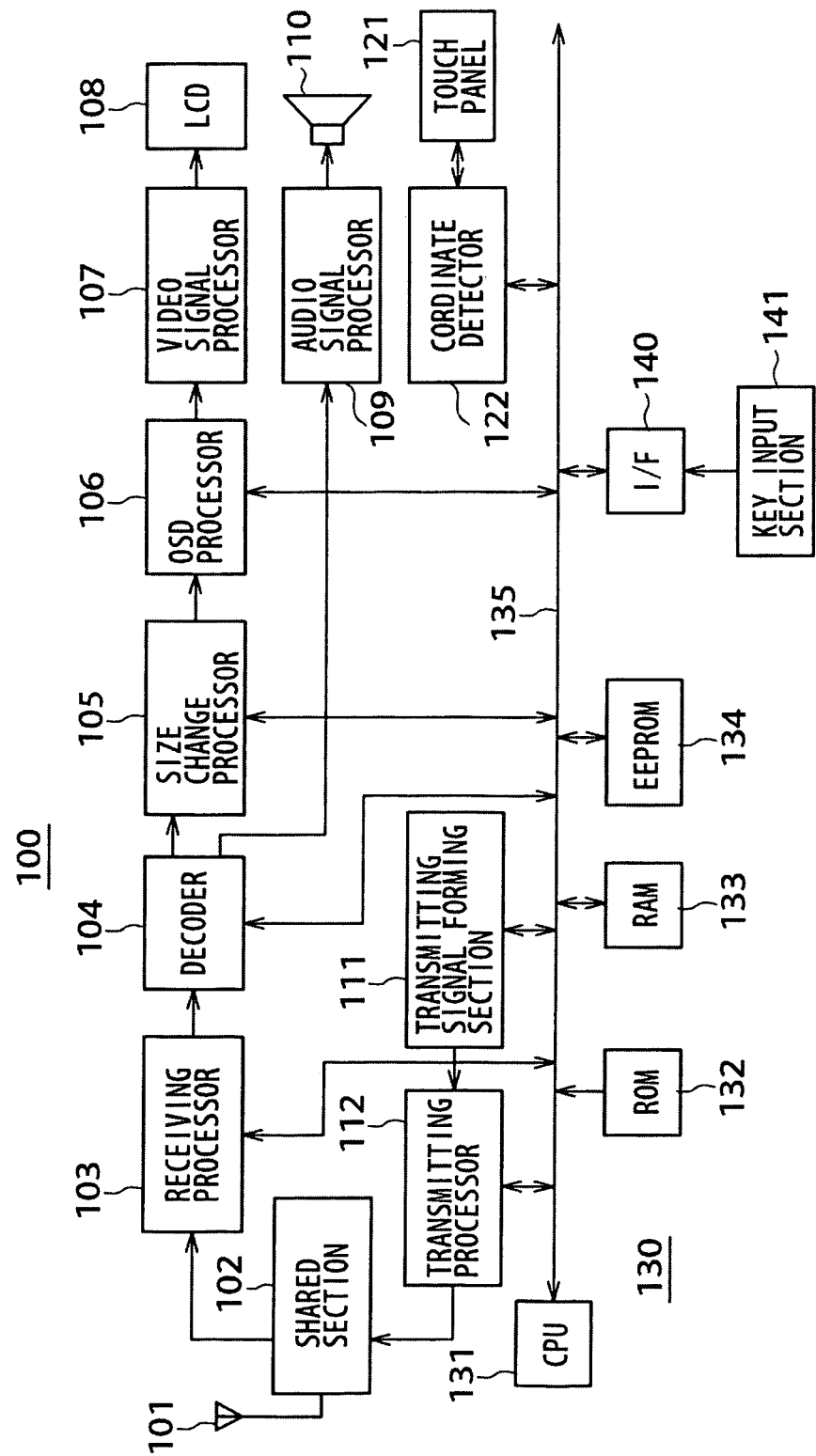
FIG. 2 is a block diagram for explaining a display device according to an embodiment of the present invention.

Then, the respective devices that constitute the two-way communication system according to this embodiment will be described in more detail. First, a description will be given of the display device 100 that conducts a change in the size of the main display information (a change in the size) according to the display/non-display of the control panel CP. FIG. 2 is a diagram for explanation of the display device 100 according to this embodiment.

As shown in FIG. 2, the display device 100 includes a transmitting and receiving antenna 101, an antenna shared section 102, a receiving processor 103, a decoder 104, a size change processor 105, an audio signal processor 109, a speaker 110, a transmitting signal forming section 111, a transmitting processor 112, a touch panel 121, and a coordinate detector 122.

The respective sections of the display device 100 according to this embodiment are controlled by a controller 130. The controller 130 is a microcomputer having a CPU (central processing unit) 131, a ROM (read only memory) 132, a RAM (random access memory) 133, and an EEPROM (electrically erasable programmable ROM) 134 connected to each other through a CPU bus 135, as shown in FIG. 2.

The ROM 132 has various processing programs that are executed in the display device 100 of this embodiment and data necessary for processing recorded therein. The RAM 133 is mainly used as an operation area of the various processing, for example, temporarily stores and holds data obtained in the various processing.

The EEPROM 134 is made up of a so-called nonvolatile memory that does not lose information stored and held even if a power supply turns off. For example, the EEPROM 134 can store and hold various setting parameters, a web page on the Internet which is acquired through the base device 200, and an e-mail that is transmitted or received through the base device 200.

First, the operation of the display device 100 at the time of receiving a radio signal from the base device 200 will be described. In this embodiment, a radio communication is conducted between the display device 100 and the base device 200, for example, by using a protocol of an IEEE (institute electrical and electronics engineers) 802.11 system, or a protocol such as its developed protocol.

The radio signal from the base device 200 which conforms to a predetermined communication protocol is received by the transmitting and receiving antenna 101 of the display 100. The radio signal is then supplied to the receiving processor 103 through the antenna shared section 102 (hereinafter simply referred to as "shared section"). The shared section 102 prevents the transmitting signal and the received signal from interfering with each other.

That is, the display device 100 can receive the signal from the base device 200 through the transmitting and receiving antenna 101, and can also transmit the operation signal from the display device 100 through the transmitting and receiving antenna 101 by radio as will be described later. For that reason, the shared section 102 prevents the transmitting signal from the transmitting processor 112 from interfering with the received signal that is received through the transmitting and receiving antenna 101.

The receiving processor 103 demodulates the signal supplied thereto, and then supplies the signal that has been demodulated to the decoder (extending processor) 104. As described above, the base device 200 compresses an information signal such as a video signal or an audio signal of a television program which is tuned in to by its tuner, or display data such as text data or video data or audio data which is received through its communication processor, or the video signal or the audio signal of the contents from the DVD device 300. The receiving processor 103 then transmits the compressed information data.

For that reason, upon receiving the received signal that has been demodulated from the receiving processor 103 and compressed, the decoder 104 of the display device 100 separates the video signal and the audio signal, and extends the separated signals (decompression), to thereby restore the original signal before data compression. Then, the decoder 104 supplies the display signal such as the restored video signal (digital video signal) to the size change processor 105, and supplies the restored audio signal (digital audio signal) to the audio signal processor 109.

The size change processor 105 reduces the size of the image to be displayed under the control from the controller 130 in the case where the operation display information such as the control panel CP is displayed as will be described later. In the case where the control panel CP is not displayed, a process of reducing the image is not conducted for displaying the image on the entire display screen of the LCD 108, and the image that displays the image having the normal size is outputted.

More specifically, in the case where the control panel CP is displayed, the size change processor 105 thins out the digital video signal, reduces the size of the image corresponding to the supplied digital video signal, and forms a digital video signal for displaying the reduced image at a desired position of the LCD 108 under the control from the controller 130. The digital video signal is converted into an analog video signal in the size change processor 105, and then supplied to the OSD processor 106.

In the case where the operation display information such as the control panel CP is not displayed, it is unnecessary to reduce the main display information to be displayed. Therefore, the size change processor 105 converts the digital video signal supplied thereto into an analog video signal, and then supplies the analog video signal to the OSD processor 106.

The OSD processor 106 forms an analog video signal for displaying the control panel CP described above with reference to FIG. 1, various messages or various guidance displays according to data that is supplied from the controller 130. The OSD processor 106 then combines the analog video signal with the video signal from the size change processor 105. That is, the OSD processor 106 is a so-called text/graphic processor circuit for displaying auxiliary display information such as characters, graphics or symbols other than the main display information.

The video signal combined in the OSD processor 16 is supplied to the video signal processor 107. In the case where it is unnecessary to combine the auxiliary display information such as the control panel CP, no display information is supplied to the OSD processor 106. Therefore, the analog video signal from the size change processor 105 is supplied to the video signal processor circuit 107 as it is.

The video signal processor 107 forms a signal that is supplied to the LCD 108 according to the video signal that is supplied through the OSD processor 106, and then supplies the signal to the LCD 108. As a result, an image corresponding to the video signal that has been transmitted from the base device 200 by radio is displayed on the display screen of the LCD 108. In this case, in the case where the auxiliary display information such as the control panel CP is combined in the OSD processor 106, the display information such as the control panel CP is displayed together with the main display information that is reduced in the size change processor 105.

That is, the video signal of the main display information which has been reduced in the size change processor 105 is combined with the auxiliary display information such as the control panel CP which has been formed according to the information from the controller 130 in the OSD processor 106. As shown in the LCD 108 of the display device 100 in FIG. 1, for example, the record history information of the DVD as the reduced main display information and the control panel CP can be combined together and displayed so as not to overlap with each other.

On the other hand, the audio signal amplifier 109 amplifies an audio signal supplied thereto to a predetermined level, and then supplies the audio signal to the speaker 110. As a result, a voice corresponding to the audio signal that has been transmitted from the base device 200 by radio sounds from the speaker 110.

As described above, the display device 100 receives the video signal and the audio signal which are transmitted from the base device 200 by radio, and reproduces and outputs the received video signal and audio signal for supplying to the user.

Now, a description will be given of the operation of the display device 100 in the case where the control panel is displayed on the LCD 108 of the display device 100 to receive the operation input from the user, and the operation signal corresponding to the operation input is transmitted to the base device 200. In this example, as shown in FIG. 1, the control panel CP for controlling the DVD device 300 is displayed to receive the operation input with respect to the DVD device 300 will be described.

As described above, the touch panel is attached onto the LCD 108 of the display device 100 according to this embodiment. In a state where the display device 100 is powered on and the control panel CP is not displayed, when the user' finger touches the touch panel 121, the coordinate detector 122 detects the touch position (coordinate position) of the finger on the touch panel 121, and then notifies the controller 130 of the touch position.

In a state where the control panel is not displayed, when the controller 130 is notified of the touch position by the coordinate detector 122, the controller 130 judges that the notification is the display instruction of the control panel. In this embodiment, in order to first display the control panel CP for the DVD device 300, the controller 130 reads necessary information from the ROM 132, forms information for displaying the control panel CP, and supplies the information to the OSD processor 106.

In addition, as described above, the controller 130 reduces the main display information in order to display it on the control panel CP, and instructs the formation of the video signal for displaying the main display information at a predetermined position on the display screen to the size change processor 105.

As described above, in accordance with the control from the controller 130, the size change processor 105 thins out the video signals from the decoder 104 to form the video signal for reducing and displaying the main display information corresponding to the video signal, and supplies the video signal to the OSD processor 106.

Upon receiving the information from the controller 130, the OSD processor 106 forms the video signal for displaying the control panel CP, and combines the video signal with a video signal for displaying the main display information to be reduced by the size change processor 105. As a result, the OSD processor 106 displays the main display information MG and the control panel CP on the display screen of the LCD 108 so as not to overlap the display area of the main display information MG with the display area of the control panel CP as shown in FIG. 1.

Then, when the user's finger touches a position on the touch panel 121 where an intended operation key of the control panel CP which is displayed on the display screen of the LCD 108 is displayed, the touch position is detected by the coordinate detector 122, and then the controller 130 is notified of it. The controller 130 discriminates the operation key of the control panel CP which is displayed at the touch position on the touch panel 121 from the coordinate detector 122, forms an operation signal corresponding to the operation key and supplies the operation signal to the transmitting signal forming section 111.

The transmitting signal forming section 111 forms a transmitting signal to be transmitted to the base device 200 according to the operation signal from the controller 130, and then supplies the transmitting signal to the transmitting processor 112. The transmitting processor 112 modulates and amplifies the supplied transmitting signal to form a transmitting signal of a format that is actually transmitted, and transmits the transmitting signal to the base device 200 through the shared section 102 and the transmitting and receiving antenna 101 by radio.

In this manner, the operation signal that is transmitted from the display device 100 by radio is received by the base device 200. Then, in this example, in the base device 200, a remote control signal for the DVD device 300 is formed according to the operation signal from the display device 100, and then transmitted to the DVD device 300 so as to remotely control the DVD device 300.

Also, the display device 100 according to this embodiment is connected with a key input section 141 through an interface 140 (I/F in FIG. 2). The key input section 141 has, for example, an on/off switch of a power supply. The operation input that has been received through the key input section 141 is supplied to the controller 130 through the I/F 140, and the controller 130 executes processing such as power-on according to the operation key.

In this example, the description is given of a case in which the operation signal is transmitted to the DVD device 300 through the control panel CP for the DVD device 300. However, the base device 200 can also be remotely controlled by means of the display device 100 as with the DVD device 300.

That is, in the case of remotely controlling the base device 200 through the display device 100, the control panel for the base device 200 is displayed on the display device 100. The control device switchably displays the device to be controlled.

As will be described later, the base device 200 judges whether the operation signal from the display device 100 is intended for the base device 200 or for the external input device such as the DVD device 300 which is connected to the base device 200. When the operation signal is intended for the external input device, the base device 200 transmits the operation signal to the external input device as described above.

When the operation signal from the display device 100 is intended for the base device 200, the base device 200 is controlled by itself according to the operation signal. As a result, the analog terrestrial television signal in the base device 200 is tuned in to through the display device 100, or the information is transferred through the communication processor of the base device 200.

[Base Device 200]

Figure 3:
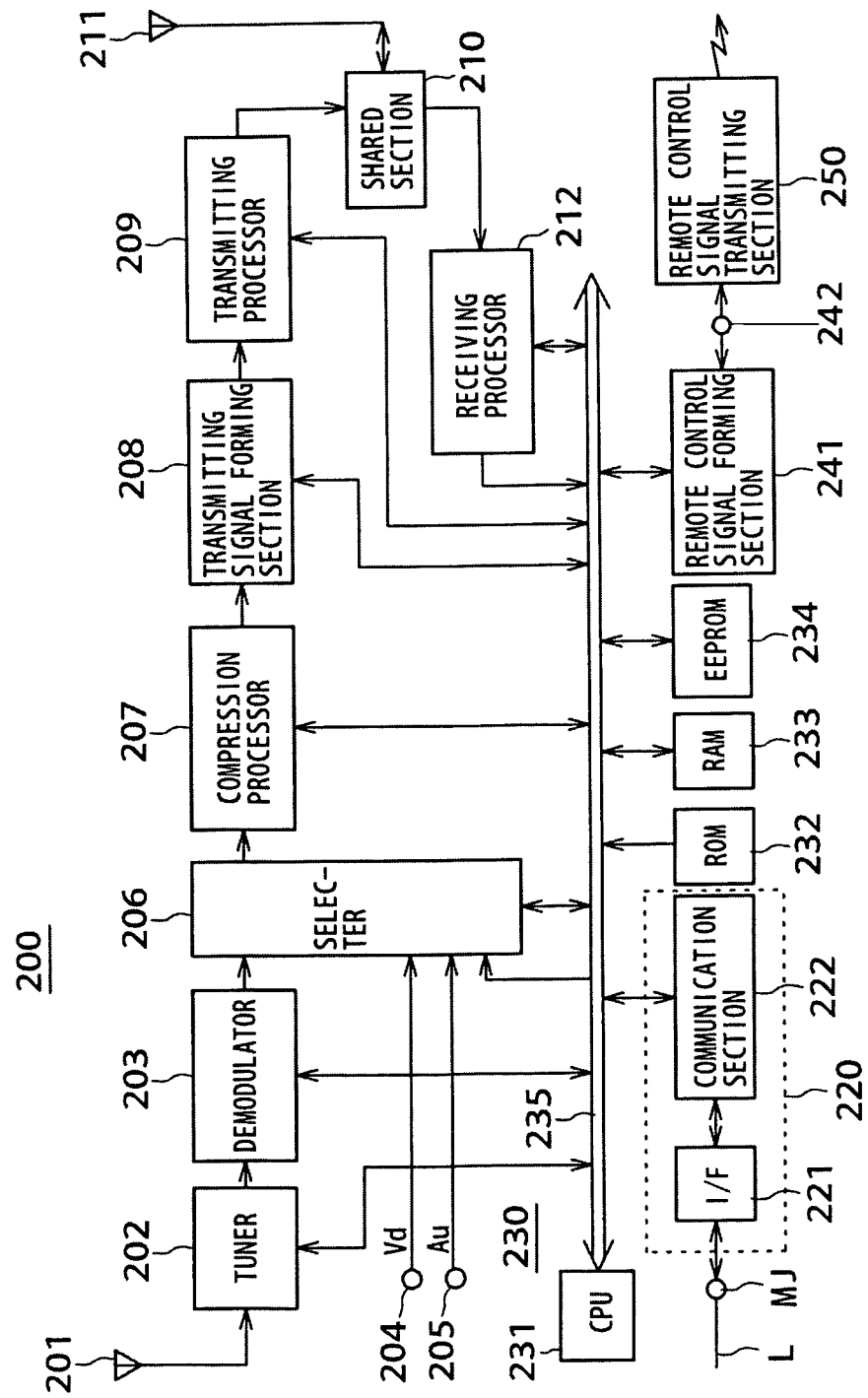
FIG. 3 is a block diagram for explaining a base device.

Now, the base device 200 shown in FIG. 1 will be described in more detail. FIG. 3 is a block diagram for explaining the base device 200 according to this embodiment. As shown in FIG. 3, the base device 200 includes a tuner 202 that is connected to a receiving antenna 201 of the analog terrestrial television signal which is located outdoor, a demodulator 203, an input terminal 204 of the video signal (Vd), an input terminal 205 of the audio signal (Au), a selector 206, a compression processor 207, a transmitting signal forming section 208, a transmitting processor 209, and an antenna shared section (hereinafter simply referred to as "shared section") 210, a transmitting and receiving antenna 211 and a receiving processor 212.

The respective sections of the base device 200 according to this embodiment are controlled by a controller 230. The controller 230 is a microcomputer that is made up of a CPU 231, a ROM 232, a RAM 233, and an EEPROM 234 through a CPU bus 235 as shown in FIG. 3.

In this example, the ROM 232 has various processing programs that are executed in the base device 200 of this embodiment and data necessary for processing recorded therein. The RAM 233 is mainly used as an operation area of the various processing, for example, temporarily stores and holds data obtained in the various processing.

The EEPROM 234 is made up of a so-called nonvolatile memory that does not lose information stored and held even if a power supply turns off. For example, the EEPROM 234 can realize a so-called last channel memory function that stores and holds the information on a broadcast channel which has been tuned in to immediately before the power supply of the base device 200 has turned off, and tunes in to a broadcast signal of the channel that has been tuned in to immediately before the power supply has turned off after the power supply turns on.

Also, the controller 230 is connected with a communication processor 220. The communication processor 220 is made up of an interface (hereinafter referred to as "I/F") section 221, and a communication section 222. The I/F section 221 is an interface between a communication line, that is, a telephone line in this embodiment and the base device 200. The I/F section 221 receives a signal that is transmitted through the telephone line and transmits a signal from the base device 200 to the telephone line.

The communication section 222 demodulates the signal that has been received through the I/F section 221 and supplies the signal to the controller 230. The communication section 222 also modulates the transmitting signal from the controller 230 and supplies the transmitting signal to the I/F section 221. As a result, the communication section 222 can transmit and receive various data with respect to a third party to which the telephone line is connected.

The base device 200 according to this embodiment is connected to the Internet through the communication processor 220, a telephone line L and a predetermined ISP (Internet service provider) so as to receive various information, and transmit and receive an e-mail through the Internet.

For that reason, the controller 230 controls the communication processor 220 so as to conduct on-hook or off-hook. The controller 230 has a function of a so-called dialer that transmits a dial signal to the telephone line when the controller 230 controls the communication processor 220 so as to conduct the off-hook.

Also, the controller 230 is connected with a remote control signal transmitter 250 through a remote control signal forming section 241, an output terminal 242 of the remote control signal. The controller 230 is so designed as to form the remote control signal according to the operation signal from the display device 100 and send the remote control signal as described above.

Although being not shown, the controller 230 is connected with a key input section having an on/off key of the power supply and various setting keys provided therein so as to conduct the on/off operation of a main power supply for the base device 200 and various setting inputs through the key input section.

Then, in this embodiment, the tuner 202 of the base device 200 is supplied with a television signal that has been received by the receiving antenna 201 as shown in FIG. 3. The tuner 202 tunes into the television signal among the television signals from the receiving antenna 201 according to a tuning instruction signal from the controller 230, and then supplies the tuned television signal to the demodulator 203. The demodulator 203 demodulates the television signal supplied thereto, and supplies a modulated signal (television program signal) to the selector 206.

The selector 206 is supplied with the video signal that is inputted through the external input terminal 204 of the video signal, the audio signal that is inputted through the external input terminal 205 of the audio signal as well as the information from the controller 230. The information that is supplied to the selector 206 from the controller 230 is information of a so-called web page which is taken in through the communication processor 220, for example, which is published on the Internet, or information of e-mail.

The selector 206 switches over whether a signal from the demodulator 203 is outputted; a signal from the external input terminals 204 and 205 is outputted, or a signal from the controller 230 is outputted, according to a switch control signal from the controller 230. The switch control signal that is supplied to the selector 206 from the controller 230 is formed in the controller 230 according to the operation signal that is transmitted from the display device 100 by radio as described above.

An output signal from the selector 206 is supplied to the compression processor 207. The compression processor 207 compresses the signal supplied thereto by using a predetermined compression system. In the compression processor 207, the signal from the selector 206 is compressed by, for example, using the data compression system such as the MPEG system or the Wavelet system.

The signal that has been compressed in the compression processor 207 is supplied to the transmitting signal forming section 208. The transmitting signal forming section 208 forms a transmitting signal that conforms to a predetermined communication protocol. As described above, in this embodiment, the base device 200 forms a transmitting signal that conforms to, for example, a protocol of the IEEE802.11 system or its developed protocol.

The transmitting signal that has been compressed in the compression processor 207 is supplied to the transmitting processor 209. The transmitting processor 209 modulates or amplifies the transmitting signal according to the control signal from the controller 230. The transmitting signal that has been processed in the transmitting processor 209 is transmitted through the shared section 210 and the transmitting and receiving antenna 211. The shared section 210 prevents the transmitting signal from interfering with the receiving signal as with the shared section 102 of the display device 100 shown in FIG. 2.

The video signal and the audio signal of the television program which has been tuned in to by the tuner 202, the video signal and the audio signal that have been received through the external input terminals 204 and 205, or text data, the video data and the audio data of the information that has been acquired through the communication processor 220 are compressed and transmitted by a predetermined communication protocol by radio. Thus, those signals or data can be supplied to the display device 100.

Subsequently, the operation of the base device 200 in the case of receiving the operation signal that is transmitted from the display device 100 by radio will be described. The operation signal from the display device 100 which has been received through the transmitting and receiving antenna 211 is supplied to the receiving processor 212 through the shared section 210. The receiving processor 212 demodulates the signal supplied thereto, subjects the signal to analog/digital conversion into a signal that can be treated by the controller 230, and supplies the signal to the controller 230.

When the signal from the receiving processor 212 is an operation signal for the external input device, that is, the DVD device 300 in this embodiment, the controller 230 controls to supply the received operation signal to the remote control signal forming section 241 and form the remote control signal according to the received operation signal.

The remote control signal forming section 241 forms a remote control signal that is supplied to the DVD device 300 which is an external input device on the basis of a signal from the controller 230. The remote control signal forming section 241 then supplies the remote control signal to the remote control signal transmitter 250 through an output terminal 242 of the remote control signal which is connected to the remote control signal transmitter 250 in this embodiment.

The remote control signal transmitter 250 transmits the remote control signal from the remote control signal forming section 241 as an infrared remote control signal. In this manner, the remote control signal transmitter 250 transmits the operation signal for the DVD device 300 from the display device 100 as the infrared remote control signal so as to remotely control the DVD device 300.

Also, when the signal from the receiving processor 212 is an operation signal for itself, that is, the base device 200, the controller 230 controls the respective sections according to the received operation signal. As a result, the controller 230 can change tuning by means of the tuner 201, or switch over the signal outputted from the selector 206.

Also, when the signal from the receiving processor 212 is a request for acquiring an intended web page, a request for receiving e-mail, or a request for transmitting the e-mail, the controller 230 controls the communication processor 220, and connects a telephone line with respect to a subscribed ISP to connect with the Internet. Then, the controller 230 can acquire the intended web page, receive the e-mail addressed to self, or transmit the e-mail to an intended third party.

In this manner, the base device 200 according to this embodiment receives, tunes in to and demodulates the television signal, and receives and demodulates the demodulated video signal and audio signal of the television program, the video signal and audio signal that are supplied from the external input device through the external input terminals 204 and 205, video data and audio data which receive, or video data and audio data which are received through the communication processor 220 and the telephone line. The base device 200 then compresses the demodulated video data or audio data, and transmits the compressed data according to a predetermined communication protocol by radio.

In addition, the base device 200 according to this embodiment receives the operation signal that is transmitted from the display device 100 by radio, and forms and transmits a remote control signal for controlling itself or the external input device according to the operation signal. Also, the base device 200 transmits the transmission information such as an e-mail which is transmitted from the display device 100 by radio through the communication processor 220 according to the operation signal.

[DVD Device 300]

Figure 4:
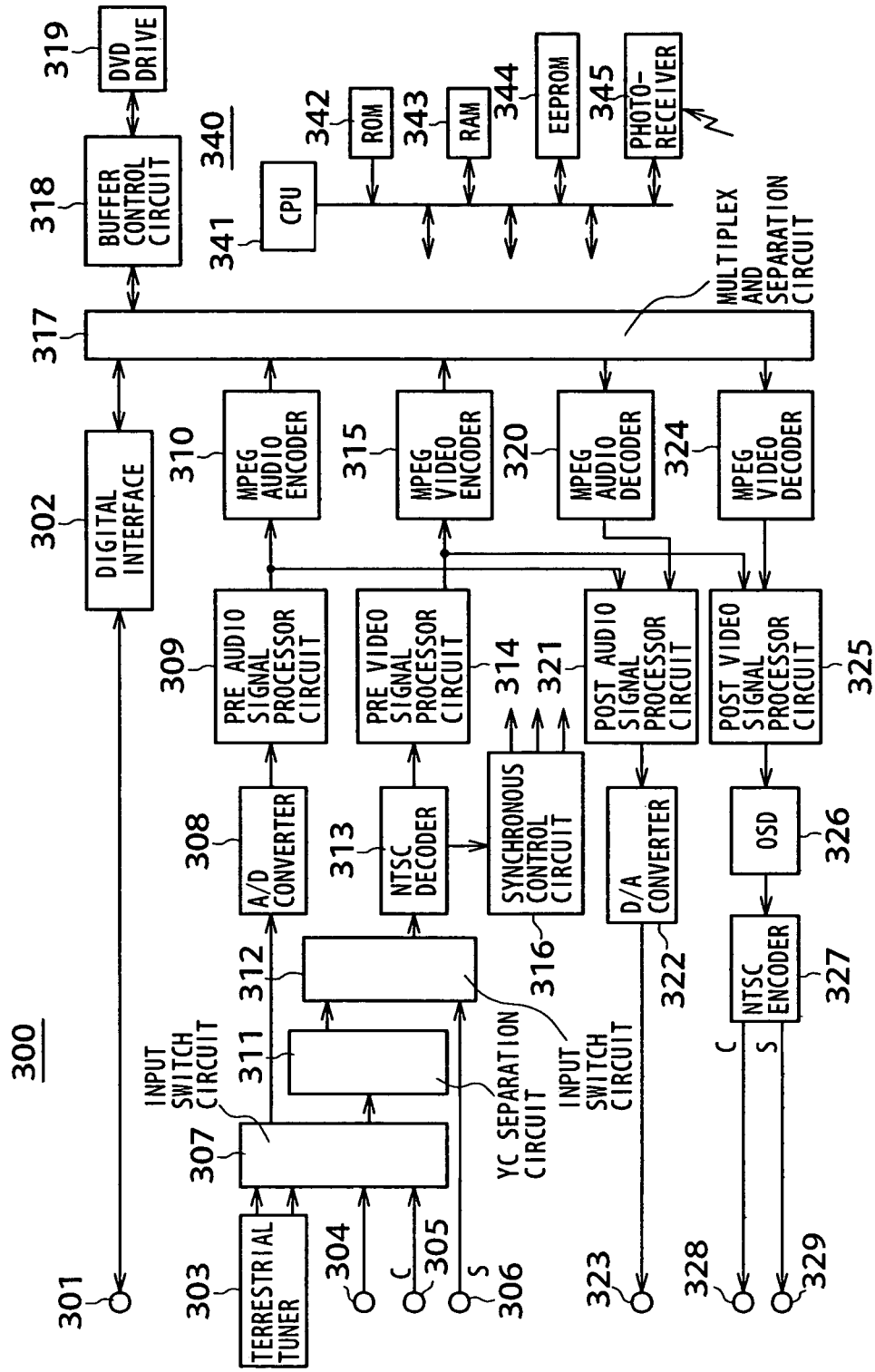
FIG. 4 is b block diagram for explaining a DVD device.

Now, a description will be given of the DVD device 300 which is the external input device that is connected to the base device 200 in this embodiment as shown in FIG. 1. FIG. 4 is a block diagram for explanation of the DVD device 300.

As shown in FIG. 4, the DVD device 300 according to this embodiment includes an input and output system of a digital, signal having a digital input and output terminal 301 and a digital interface 302, an input system of an analog signal having a terrestrial tuner 303 to a synchronous control circuit 316, an output system of the analog signal having an MPEG audio decoder 320 to an output terminal 329 of a separate video signal, a multiplex and separation circuit 317, a buffer control circuit 318, a DVD drive 319, and a controller 340.

In FIG. 4, the controller 340 controls the entire DVD device 300, and is formed of a microcomputer having a CPU 341, a ROM 342, a RAM 343 and an EEPROM 344 connected to each other through a bus.

Also, as shown in FIG. 4, the controller 340 is connected with a photoreceiver 345 of an infrared remote control signal. The photoreceiver 345 optically receives the infrared remote control signal to the controller 340 from the external, converts the received signal into an electric signal, and then supplies the electric signal to the controller 340. With this structure, the controller 340 controls the respective sections according to the received remote control signal, and conducts) various setting, for example, with respect to the EEPROM 344.

The ROM 342 has various processing programs that are executed in the DVD device 300 of this embodiment and data necessary for processing recorded therein. The RAM 343 is mainly used as an operation area, for example, temporarily stores results during processing. Also, the EEPROM 344 is made up of a so-called nonvolatile memory for storing and holding data to be held even if a power supply turns off, for example, various setting data.

[Application of Digital Input]

Then, a description will be given of the operation of the DVD device 300 according to this embodiment in the case of receiving information through the respective input terminals. First, a description will be given of processing in the case of recording, in the DVD, a TS (transport stream) signal in which a digital video signal, a digital audio signal and a control signal which are supplied through the digital input and output terminal 301 are brought into a packet and multiplexed in time division.

The TS signal (digital signal) that is received through the digital input and output terminal 301 from another external device such as the STB is supplied to the digital interface circuit 302. The digital interface circuit 302 conducts format conversion on the supplied TS signal so that the TS signal complies with a system that is used by the DVD device 300 according to this embodiment. The digital interface circuit 302 then supplies the converted TS signal to the multiplex and separation circuit 317.

The multiplex and separation circuit 317 further analyzes and generates the control signal, forms the TS signal (TS signal of the format which is recorded in the DVD loaded in the DVD drive 319) including the control signal, and records the TS signal in the DVD loaded in the DVD drive 319 through the buffer control circuit 318.

Also, the multiplex and separation circuit 317 separates the video data (video ES (elementary stream)) and the audio data (audio ES (elementary stream)) from the TS signal which is supplied from the digital interface circuit 302, and then supplies those data to the MPEG (moving picture experts group) video decoder 324 and the MPEG audio decoder 320.

The MPEG audio decoder 320 decodes the supplied audio data, obtains the audio data of a base band, and supplies the audio data to a post audio signal processor circuit 321. The MPEG video decoder 324 decodes the supplied video data, obtains the video data of a base band, and supplies the video data to a post video signal processor circuit 325.

The post video signal processor circuit 325 switches over between the video data from the MPEG video decoder 324 and the video data from a pre video signal processor circuit 314 that will be described later, conducts screen combination or filtering, and supplies the video data that has been processed to an OSD circuit 326.

The OSD circuit 326 generates graphics and character data for screen display, processes the video data that has been supplied to the OSD circuit 326 so as to overlap the generated graphics and character data on each other or partially display the generated graphics and character data, and then supplies the video data that has been processed to an NTSC encoder 327.

After converting the inputted video data (component digital video signal) into a YC signal, the NTSC encoder 327 conducts D/A conversion, generates an analog composite video signal and an analog separate video signal S, and outputs the composite video signal C through an output terminal 328 and the separate video signal through an output terminal 329, respectively.

On the other hand, the post audio signal processor circuit 321 switches over between the audio data from the MPEG audio decoder 320 and the audio data from pre audio signal processor circuit 309, conducts a filtering process, a fading process, and a talking speed converting process, and then supplies the processed audio data to an audio D/A converter 322. The audio D/A converter 322 converts the supplied audio data into an analog audio signal, and then outputs the converted audio signal through an output terminal 323 of the analog audio signal.

The audio signal and the video signal are supplied to the base device 200 from the analog audio output terminal 323 and the analog video output terminals 328 and 329.

[Application of Analog Input]

Now, a description will be given of the operation in the case of inputting the analog signal through the terrestrial tuner 303, the analog audio input terminal 304 and the analog vide input terminals 305, 306, recording the inputted analog signal in the DVD loaded in the DVD driver 319, or outputting the analog signal.

The terrestrial tuner 303 receives, tunes and demodulates the analog terrestrial broadcast signal, obtains the analog video signal (composite signal) and the analog audio signal, and then supplies those signals to an input switch circuit 307. Also, the input switch circuit 307 also receives the analog audio signal that is supplied through the analog audio input terminal 304 and the composite vide signal C that is supplied through the analog video input terminal 305.

The input switch circuit 307 selects and outputs an intended signal according to the control signal from the controller 340. That is, the input switch circuit 307 switches over outputting the analog video signal and the analog audio signal from the terrestrial tuner 303, or outputting the analog audio signal and the analog video signal from the analog audio input terminal 304 and the analog video input terminal 305.

The analog audio signal among the signals that are outputted from the input switch circuit 307 is supplied to an analog/digital converter (hereinafter referred to as "A/D converter") 308. The analog video signal (composite signal) is supplied to a YC separation circuit 311. The YC separation circuit 311 separates the supplied analog video signal into Y and C, that is, into a brightness signal and a color difference signal, and then supplies those signals to an input switch circuit 312. The input switch circuit 312 is also supplied with a separate video signal S from the external.

The input switch circuit 312 selects one of the separate video signal S from the external and the video signal from the YC separate circuit 311 according to an instruction from the controller 340, and then supplies the selected video signal to an NTSC (national television system committee) decoder circuit 313.

The NTSC decoder circuit 313 conducts the analog/digital conversion (hereinafter referred to as "A/D conversion") and chromatic decoding on the inputted analog video signal, converts the signal into a digital component video data (video data), and then supplies the converted data to the pre video signal processor circuit 314. Also, the NTSC decoder 313 supplies a clock that is generated with reference to a horizontal synchronous signal of the inputted video signal, and a horizontal synchronous signal, a vertical synchronous signal and a field discrimination signal which are obtained by synchronous separation to the synchronous control circuit 316.

The synchronous control circuit 316 generates a clock signal and a synchronous signal which provide timing required by the respective circuit blocks with reference to the respective supplied signals. The synchronous control circuit 316 then supplies those signals to the respective circuits that require those signals.

The pre video signal processor circuit 314 subjects the inputted video data to various video signal processing such as pre-filtering, and the processed video data to the MPEG video encoder 315 and the post video signal processor circuit 325.

The MPEG video encoder 315 subjects the video data from the pre video signal processor circuit 314 to an encoding process such as block DCT (discrete cosine transform) to generate a video ES, and then supplies the video ES to the multiplex and separation circuit 317.

On the other hand, the audio signal that has been selected by the input switch circuit 307 is supplied to the pre audio signal processor circuit 309 after having been converted into a digital audio signal (audio data) by the A/D converter 308. The pre audio signal processor circuit 309 subjects the supplied audio data to filtering, and then supplies the filtered audio data to the MPEG audio encoder 310.

After compressing the supplied audio data according to the MPEG format, the MPEG audio encoder 310 generates an audio ES and then supplies the audio ES to the multiplex/separation circuit 317 as in the video data.

The multiplex and separation circuit 317 multiplexes the video ES from the MPEG video encoder 315, the audio ES from the MPEG audio encoder 310, and various control signals during recording. In other words, during recording, the multiplex and separation circuit 317 combines and multiplexes the inputted MPEG video ES, MPEG audio ES and various control signals, and generates, for example, the TS signal of the MPEG system. The TS signal that is generated in the multiplex and separation circuit 317 is recorded in the DVD loaded in the DVD drive 319 through the buffer control circuit 318.

Also, as shown in FIG. 4, the audio data from the pre audio signal processor circuit 309 is also supplied to the post audio signal processor circuit 321. The video data from the pre video signal processor circuit 314 is also supplied to the post video signal processor circuit 325.

Then, the post audio signal processor circuit 321 and the D/A converter 322 function to form and output the analog audio signal. The post video signal processor circuit 325, the OSD circuit 326 and the NTSC encoder 327 function to form and output the analog video signal.

That is, the video data and the audio data to be recorded can be reproduced and outputted while the analog signal that is supplied through the terrestrial tuner 303, the analog audio input terminal 304 and the analog video input terminals 305, 306 is converted into a digital signal, and then recorded in the DVD loaded in the DVD drive 319.

Otherwise, it is possible that the signals from the terrestrial tuner 303, the analog audio input terminal 304 and the analog video input terminals 305 and 306 are converted into digital signals and then outputted as digital signals to the external device through the digital interface 302 and the digital input and output terminals 301.

[Reproduction of Data from the DVD Loaded in the DVD Drive 319]

Subsequently, a description will be given of the operation of the DVD device 300 in the case of reproducing the video signal and the audio signal that have been recorded in the DVD loaded in the DVD drive 319 in the above manner. An intended TS signal to be reproduced from the DVD loaded in the DVD drive 329 is read and then supplied to the multiple and separation circuit 317 through the buffer control circuit 318 under the control from the controller 340.

During reproduction, the multiplex and separation circuit 317 separates the video ES and the audio ES from the TS signal read from the DVD loaded in the DVD drive 319. Then, the multiplex and separation circuit 317 supplies the separated audio ES to the MPEG audio decoder 320, and supplies the separated video ES to the MPEG video decoder 324.

The processing in the respective circuits subsequent to the MPEG audio decoder 320 and the processing in the respective circuits subsequent to the MPEG video decoder 324 are described in the case of using the digital input. That is, the analog audio signal is formed and outputted from the audio ES that has been supplied to the MPEG audio decoder 320, and the analog video signal is formed and outputted from the video ES that has been supplied to the MPEG video decoder 324.

As a result, the audio signal and the video signal which are outputted through the analog audio output terminal 323 and the analog video output terminals 328 and 329 can be supplied to the base device 200.

Otherwise, it is possible that the digital video signal and the digital audio signal which are read from the DVD loaded in the DVD drive 319 are outputted through the digital interface 302 and the digital input and output terminal 301, and then supplied to an external device.

In this embodiment, the video data and the audio data are compressed in the MPEG system. However, it is possible to use another compression system, or it is possible to process the video data and the audio data which remain uncompressed without being compressed.

As described above, the DVD device 300 used in this embodiment can read and decode the data of intended contents which have been recorded in the DVD loaded in the DVD drive 319, and supply the decoded data to the base device 200 as the analog video signal and the analog audio signal.

It is also possible that the remote control signal that has been transmitted from the remote control commander signal transmitter (remote control mouse) which is connected to the base device 200 is optically received by the photoreceiver 345 to conduct processing according to the remote control signal from the base device 200. In this case, the remote control signal that is transmitted from the remote control signal transmitter 250 of the base device 200 corresponds to the control signal from the display device 100, as described above.

Accordingly, when the user of the display device 100 operates the display device 100, the operation signal is transmitted to the base device 200 from the display device 100. Also, the remote control signal for the DVD device 300 is formed from the operation signal in the base device 200, and then transmitted to the DVD device 300. The DVD device 300 conducts processing according to the remote control signal.

[Processing in the Respective Devices in the Case of Remotely Controlling the DVD Device 300]

Subsequently, a description will be given of the respective processing of the display device 100, the base device 200 and the DVD device 300 in the case of remotely controlling the DVD device 300 through the control panel CP that is displayed on the LCD 108 of the display device 100 with reference to flowcharts of FIGS. 5 to 8.

[Processing of the Display Device 100]

Figure 6:
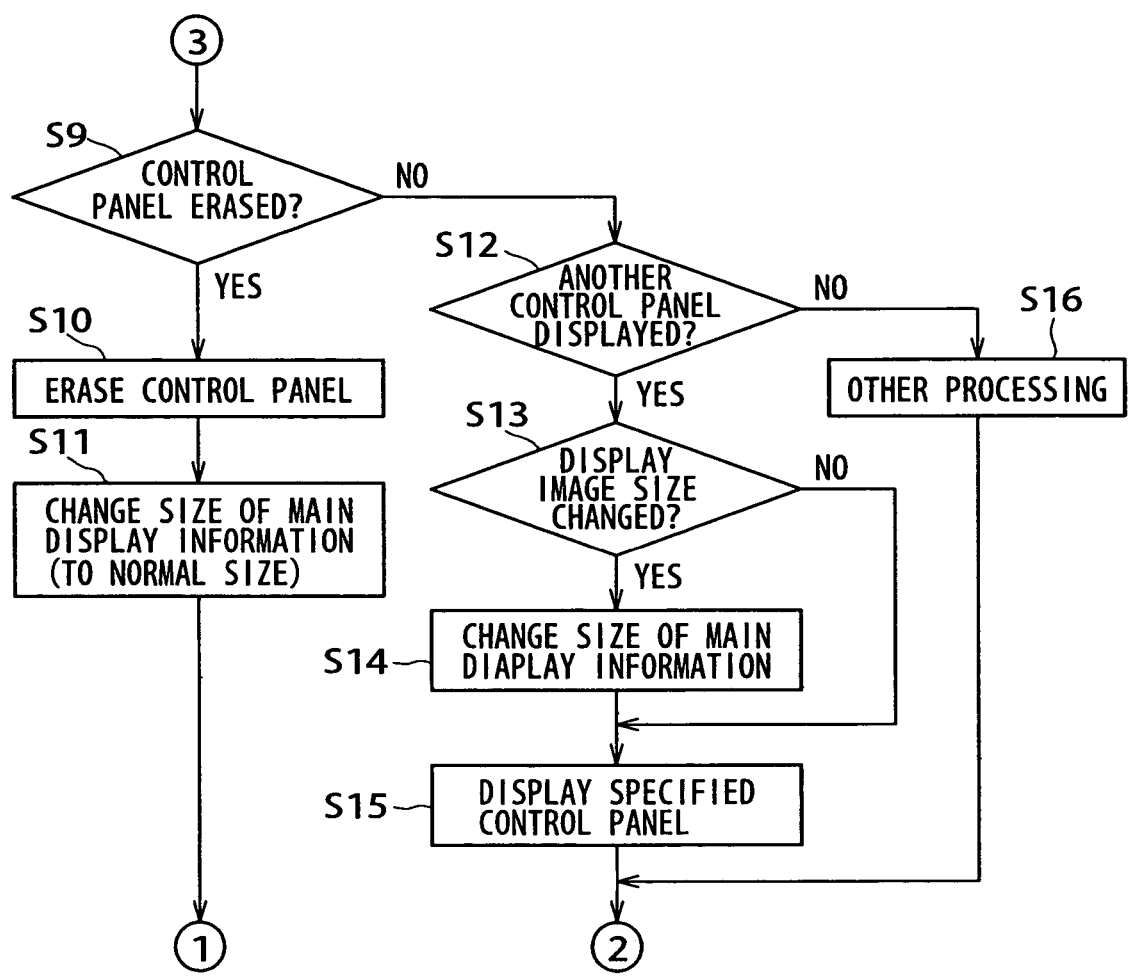
FIG. 6 is a flowchart subsequent to FIG. 5.

Subsequently, FIGS. 5 and 6 are flowcharts for explaining the processing that is executed in the controller 130 of the display device 100 after a power supply of the display device 100 turns on. As shown in FIG. 5, upon turning on the power supply, the controller 130 of the display device 100 monitors a detection output from the coordinate-detector 122, judges whether a touch of the user on the touch panel 121 is detected, or not (Step S1), and gets a standby state until the touch on the touch panel 121 is detected.

In the judging process of Step S1, when the touch on the touch panel 121 is detected, the controller 130 controls the size change processor 105 so as to reduce the video signal from the decoder 104 so that the main display information to be displayed on the display screen of the LCD 108 according to the video signal does not overlap with the control panel CP as described above (Step S2).

In addition, the controller 130 in this embodiment controls to supply, to the OSD processor 106, data for displaying the control panel CP for the DVD 300, and combine the video signal from the size change processor 105 and video signal for displaying the control panel CP, and displays the control panel CP on the display screen of the LCD 108 (Step S3).

In the processing up to Step S3, as shown in FIG. 1, the main display information which is an image to be reduced which is derived from the video signal transmitted from the base device 200 and the control panel CP are so displayed as not to overlap the respective display contents with each other on the display screen of the LCD 108.

The controller 130 of the display device 100 accepts the touch on the displayed control panel by the user, and gets in a standby state until the control panel CP is touched by the user (Step S4). In the judging process of Step S4, when it is judged that the operation input from the user is accepted, the controller 130 specifies the operation key of the control panel that is displayed at a touch position on the basis of the detection output from the coordinate detector 122 (Step S5.

Then, the controller 130 of the display device judges whether or not the specified operation key is intended for the external, that is, is intended for the base device 200 or the DVD device 300 (Step S6). In the judging process of Step S6, when the specified operation key is intended for the external, the controller 130 forms an operation signal according to the specified operation key (Step S7), and then transmits the operation signal to the base device 200 through the transmitting signals forming section 111, the transmitting processor 112, the shared section 102 and the transmitting and receiving antenna 101 by radio (Step S8). Then, the processing from Step S4 is repeated, and the controller 130 accepts the operation input from the user through the control panel.

In the judging process of Step S6, when it is judged that the operation key specified in Step S5 is not intended for the external, that is, the operation key to be treated in the display device 100, the processing is advanced to processing shown in FIG. 6 where it is judged whether or not the specified operation key instructs the erasing of the control panel (Step S9).

In the judging process of Step S9, it is judged that the specified operation key instructs the erasing of the control panel. In this case, the main display information is changed in size, and the thinning process of the video signal is stopped so that the main display information corresponding to the video signal from the base device 200 which is to be reduced and displayed has a normal size (Step S11). Then, the processing starting from Step S1 shown in FIG. 5 is repeated.

In the judging process of Step S9, when it is judged that the specified operation key does not instruct the erasing of the control panel, it is judged whether the specified operation key instructs the display of another control panel, or not (Step S12). In the judging process of Step S12, when it is judged that the specified operation key instructs the display of another control panel, it is judged whether a change in the size of the display image is required, or not (Step S13).

The judging process of Step S13 is a process of judging whether a change in the size of the main display information is necessary or not, because the control panel to be newly displayed is different in size from the control panel that has been already displayed. In the judging process of Step S13, when it is judged that a change in the size of the main display information is necessary, the controller 130 controls the size change processor 105 to conduct a reducing process or an enlarging process so that the size of the main display information meets the control panel to be newly displayed (Step S14).

The controller 130 supplies information for displaying the control panel which is instructed from the user to the OSD processor 106, and displays the main display information and the new control panel so as not to overlap their display areas with each other (Step S15). Then, the controller 130 repeats the processing starting from Step S4 shown in FIG. 5.

In the judging process of Step S12, when it is judged that the display of another control panel is not instructed, the controller 130 executes another processing in the display device 100, for example, a change in the display position of the cursor (Step S16), and repeats the processing starting from Step S4 shown in FIG. 5.

As described above, the display device 100 according to this embodiment displays the control panel for accepting the operation input on the LCD 108, and accepts the operation input from the user by using the control panel display, the touch panel 121 that is attached onto the display screen of the LCD 108, and the coordinate detector 122. Then, the display device 100 forms the operation signal according to the accepted operation input, and transmits the operation signal to the base device 200.

Then, even in the case where the control panel is displayed, the size and the display position of the main display information derived from the video signal from the base device 200 are adjusted according to the size and the display position of the displayed control panel. Therefore, the main display information and the control panel are so displayed as not to overlap with each other, and it is not hard to see the main display information by the control panel.

[Processing in the Base Device 200]

Subsequently, a description will be given of processing in the base device 200 that receives the operation signal that is transmitted from the display device 100 by radio with reference to a flowchart of FIG. 7. The processing shown in FIG. 7 is a process to be executed in the controller 230 of the base device 200 after a main power supply turns on in the base device 200.

Upon turning on the main power supply of the base device 200, the base device 200 monitors an output signal from the receiving processor 212, and judges whether or not the receiving processor 212 receives the operation signal from the display device 100 (Step S21). In the judging process of Step S21, when it is judged that the operation signal from the display device 100 is not received, the processing starting from Step S21 is repeated.

In the judging process of Step S21, when it is judged that the operation signal from the display device 100 is received, the controller 230 of the base device 200 judges whether or not the operation signal from the display device 100 is intended for the base device 200 (Step S22).

In the judging process of Step S22, when it is judged that the operation signal from the display device 100 is intended for the base device 200, the controller 230 of the base device 200 executes the processing according to the operation signal received from the display device 101 (Step S23). The controller 230 then controls the tuner 202 to change a broadcast signal to be tuned into or conduct the switch operation of the selector 206. Then, the processing starting from Step S21 is repeated. In this manner, the base device 200 can be remotely controlled by using the display device 100.

Also, in the judging process of Step S22, when it is judged that the operation signal from the display device 100 is not intended for the base device 200, the controller 230 controls the remote control signal forming section 241, and then forms the remote control signal according to the operation signal received from the display device 100 (Step S24).

The remote control signal formed in Step S24 is supplied to the remote control signal transmitter 250 through the output terminal 242 of the remote control signal of the base device 200. Then, the remote control signal is transmitted to the DVD device 300 that is an external input device as an infrared remote control signal (Step S25). As a result, the DVD device 300 can be remotely controlled through the base device 200 by means of the display device 100.

[Processing in the DVD Device 300]

Subsequently, a description will be given of the processing in the DVD device 300 that optically receives an infrared remote control signal transmitted from the remote control signal transmitter 250 of the base device 200 with reference to a flowchart of FIG. 8. The processing shown in FIG. 7 is a process that is executed in the controller 340 of the DVD device 300 in the case where the DVD device 300 turns on.

The controller 340 of the DVD device 300 judges whether or not the photoreceiver 345 of the remote control signal optically receives a remote control signal addressed to the DVD device 300 (Step S31). In the judging process of Step S31, when the controller 340 judges that the remote control signal addressed to the DVD device 300 is not optically received, the controller 340 returns the control to the processing of Step S31, and waits for the reception of the remote control signal addressed to the DVD device 300.

In the judging process of Step S31, when the controller 340 judges that the remote control signal addressed to the DVD device 300 is optically received, the controller 340 of the DVD device 300 forms a control signal according to the remote control signal addressed to the DVD device 300 (Step S32). The controller 340 then supplies the control signal to the respective related sections, to thereby conduct processing according to the received remote control signal (Step S33).

As described above, in the two-way communication system according to this embodiment, the image and the voice corresponding to the video signal and the audio signal from the base device 200 can be observed and heard by means of the display device 100. In addition, in the two-way communication system according to this embodiment, the base device 200 can be remotely controlled by using the display device 100. Also, the DVD device 300 can be remotely controlled through the base device 200 by using the display device 100. That is, the display device 100 has both of a function of a monitor receiver and a function of a remote controller.

In this embodiment, the base device 200 is connected with the DVD device 300 as shown in FIG. 1. However, the present invention is not limited to this structure. As described above, the base device 200 can be connected with not only the DVD device 300 but also various external input devices such as a VTR, an IRD or an STB.

Also, as shown in FIG. 9, the base device 200 can be connected with a plurality of external input devices such as the DVD device 300, the VTR 400, or a BS digital tuner 500 by provision of a plurality of external input terminals. In this case, the plurality of external input terminals are connected to the selector 206 of the base device 200 shown in FIG. 3, so as to be switchable under the control of the controller 230.

As shown in FIG. 9, in the case where a plurality of external input devices are connected to the base device 200, the control panel corresponding to the external input device that is connected to the base device 200 is displayed on the display screen of the display device 100.

Figure 10A:
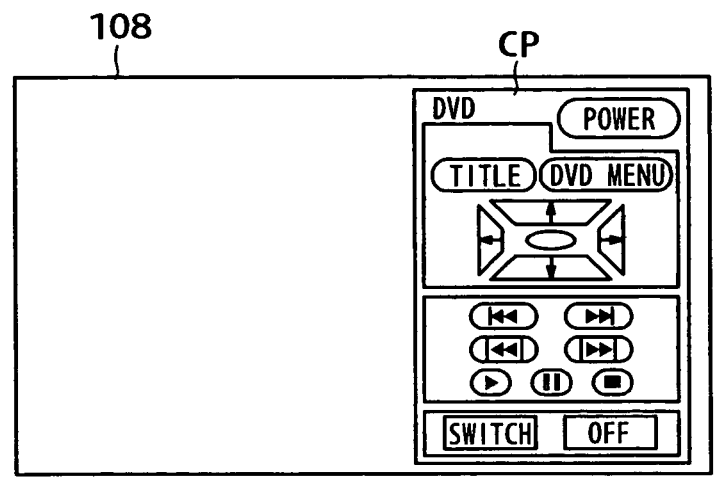
FIGS. 10A to 10C are diagrams for explaining examples of a control panel that is displayed on a display element of the display device, respectively.
Figure 10B:
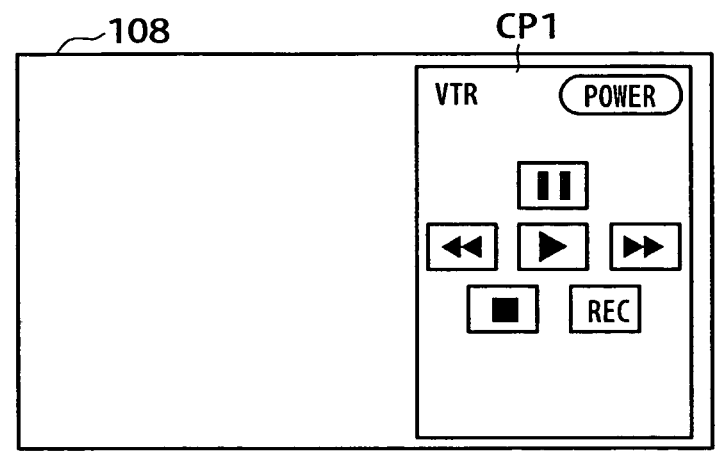
Figure 10C:
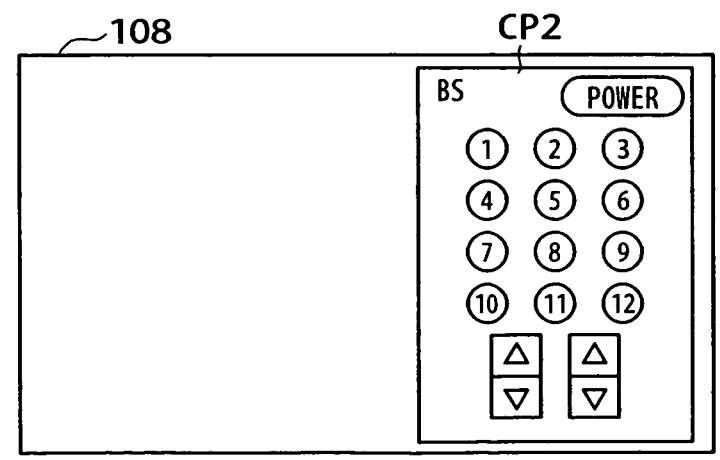

FIGS. 10A to 10C are diagrams for explaining a display example of the control panels corresponding to the plurality of external input devices which are displayed on the display device 100. FIG. 10A is a control panel CP for the DVD device 300 which includes various operation keys such as an on/off key of a power supply, arrow keys and a decision key as described above.

FIG. 10B is a control panel CP1 for the VTR, which has a pause key, a fast-forward key, a rewind key, a reproduction, key, a stop key, and a record key in correspondence with the on/off key of a power supply and the operation keys of the VTR. Also, FIG. 10C is a control panel CP2 for the BS digital tuner, which provides an on/off key of a power supply and numerical keys for channel selection.

In this embodiment, as shown in FIGS. 1 and 10A to 10C, the control panel is displayed at a right side of the LCD 108. When the user's finger repeatedly touches the touch panel other than the display area of the control panel, the control panels corresponding to the base device 200 and the respective external input devices which are connected to the base device 200 can be displayed in a rotation fashion.

More specifically, in the display device 100 according to this embodiment, the control panels are displayed in the rotation fashion, for example, in the order of (1) the control panel CP for the DVD device, (2) the control panel CP1 for the VTR 200, (3) the control panel CP2 for the BS digital tuner 400, (4) control panel erasing, and (5) the control panel for the DVD device.

In this case, as described above, the control panel for the base device 200 which has a selector switch key is displayed, and the selector switch key of the control panel is so operated as to switch over the selector 206 of the base device 200 for outputting a signal from an intended external input device. Thereafter, the control panel of the intended external input device is displayed and operated, thereby making it possible to remotely control the intended external input device through the display device 100 and the base device 200.

As described above, with the use of the control panel that is displayed on the LCD 108 of the display device 100 and the touch panel, the on/off operation of the power supply for the base device 200, a change of the channel, the switch of the selector 206, the on/off operation of the power supply for the external input device that is connected to the base device 200, and other operation controls can be remotely controlled. That is, in the case where the external input device is the VTR or the DVD device, it is possible to conduct the remote control according to the operation keys provided in the respective devices, such as the on/off operation of the power supply, pause, fast-forwarding, rewind, reproduction, stop or record.

The remote control of the base device 200 and the external input device that is connected to the base device 200 is not limited to the above remote control. For example, when the base device 200 and the DVD device 300 are adaptive for bilingual voices (double voices), switching between the main voice and the auxiliary voice can be remotely controlled through the control panel of the display device 100 with the provision of a switch key that switches over between the main voice and the auxiliary voice. Also, in the case where the external input device is the VTR or the DVD device, a reproduction speed adjusting key is disposed on the control panel, thereby making it possible to remotely control the adjustment of the reproduction speed through the control panel of the display device 100.

As described above, the remote control that is conducted through the control panel displayed on the LCD 108 of the display device 100 can perform various remote control by the provision of various operation keys on the control panel according to the functions of the device to be operated. That is, the base device 200 is used as a so-called gateway, and various source information can be watched on the display device 100.

Also, in order to smoothly operate a plurality of external input devices, it is possible that the remote control signal transmitters 250 of the same number as that of the external input devices are connected to the base device 200, and the respective remote control signal transmitters are located in the vicinity of the plurality of external input devices.

As described above, the operation display information for operating the base device 200 and the external input device that is connected to the base device 200 is displayed on the LCD 108 of the display device 100. Then, the base device 200 and the external input device that is connected to the base device 200 can be remotely controlled by using the operation display information.

Figure 11A:
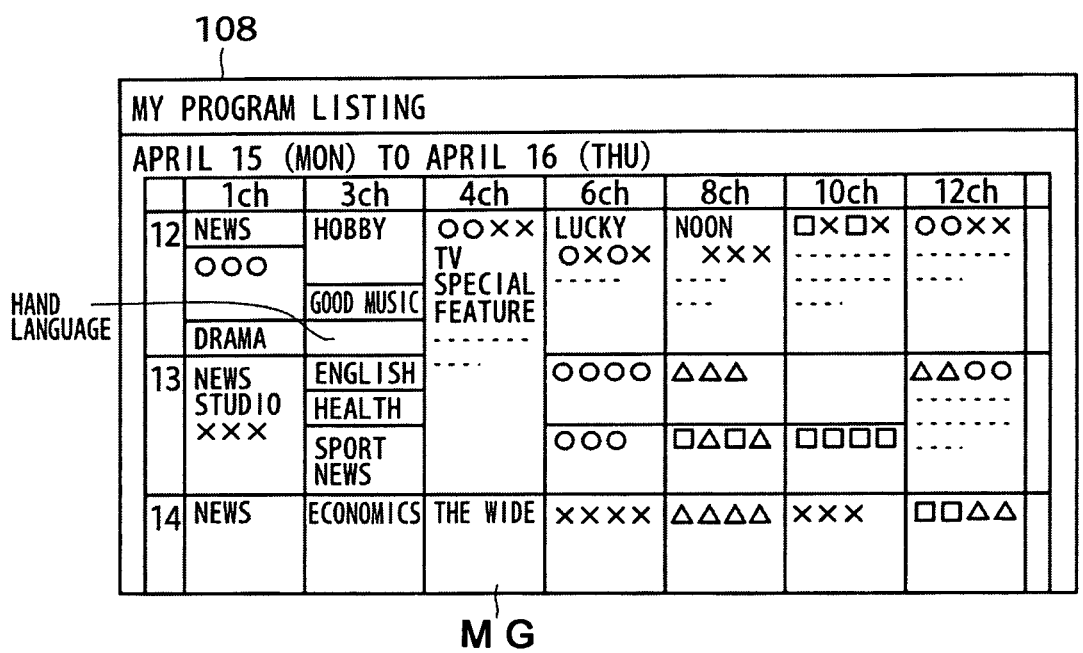
FIGS. 11A and 11B are diagrams showing an example of the display of main display information having a normal size, and the display of size-reduced main display information and the control panel.
Figure 11B:
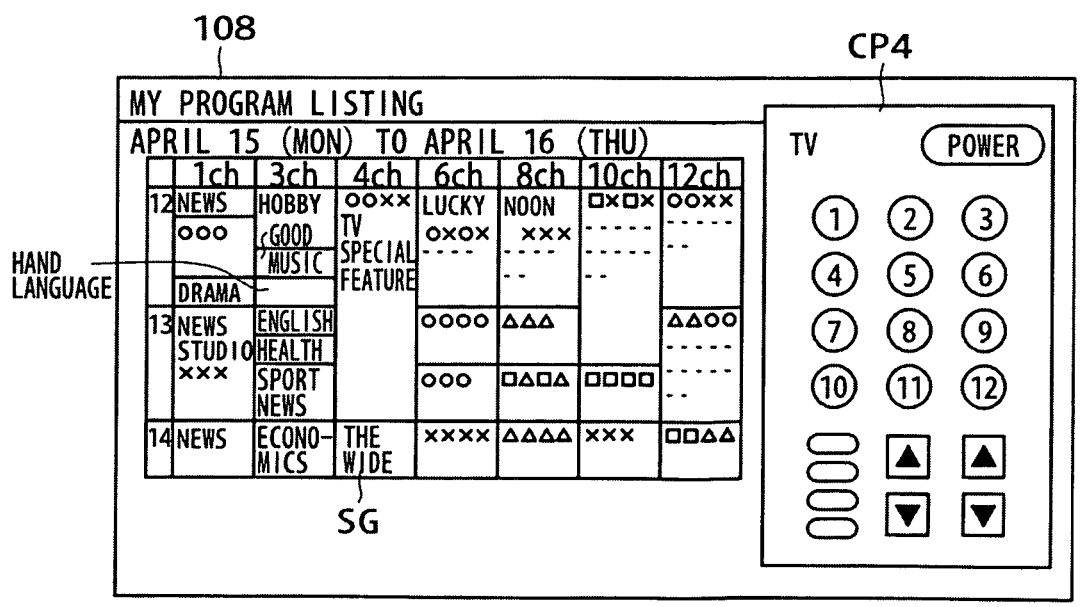

For example, in the case where a digital broadcast receiver such as the STB or the IRD is connected to the base device 200, the EPG of the digital broadcast which is supplied from the STB or the IRD can be displayed on the entire display screen of the LCD 108 as the main display information, as shown in FIG. 11A. Also, as shown in FIG. 11B, the image of the EPG which is the main display information is reduced and displayed, the control panel CP4 for the STB or the IRD is displayed, and an intended broadcast program is selected from the EPG, thereby making it possible to watch the selected broadcast program.

Even in the case where the EPG of the analog terrestrial broadcast is received from the base device 200 and displayed, the control panel for the base device 200 and the EPG can be so displayed as not to overlap their display areas with each other, likewise.

Figure 12A:
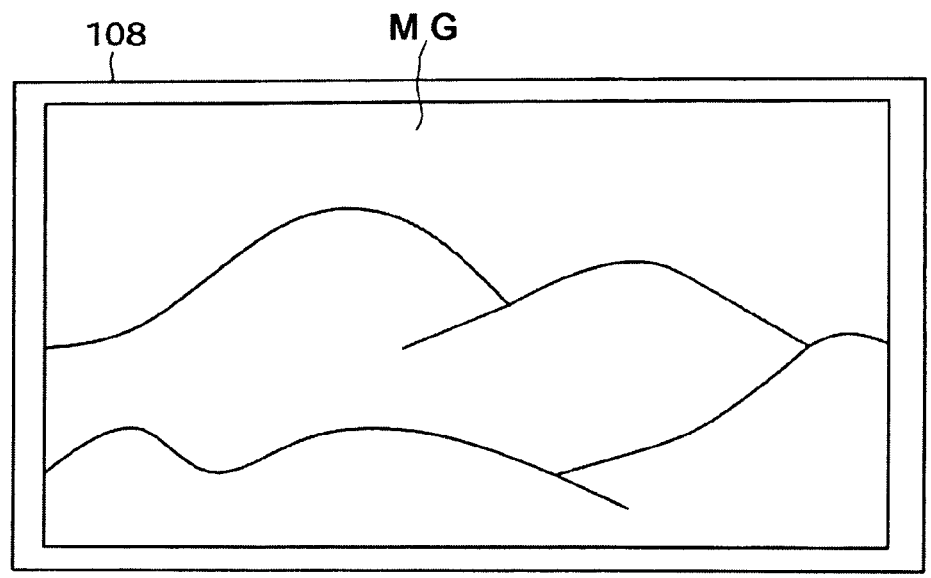
FIGS. 12A and 12B are diagrams showing another example of the main display information having the normal size and the display of the size-reduced main display information and the control panel.
Figure 12B:
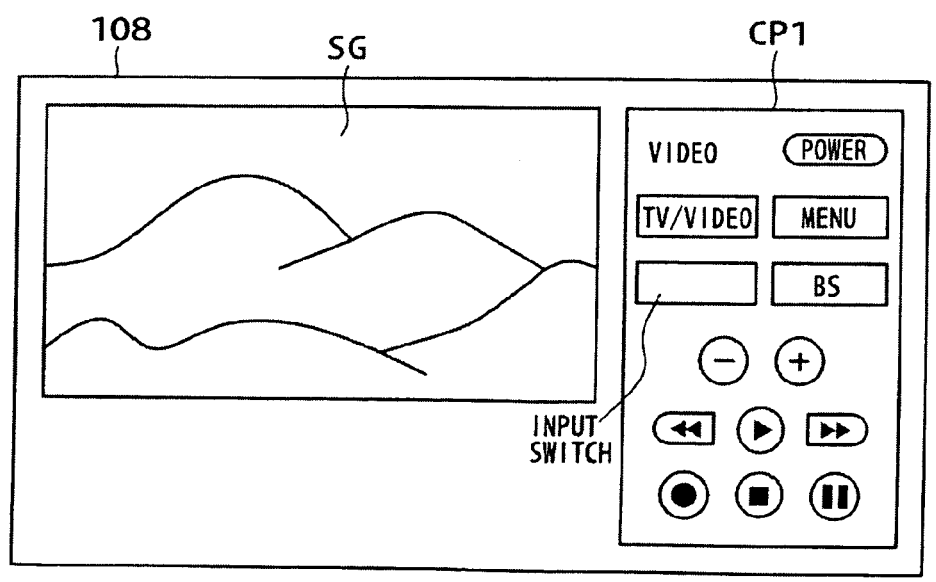
Figure 13A:
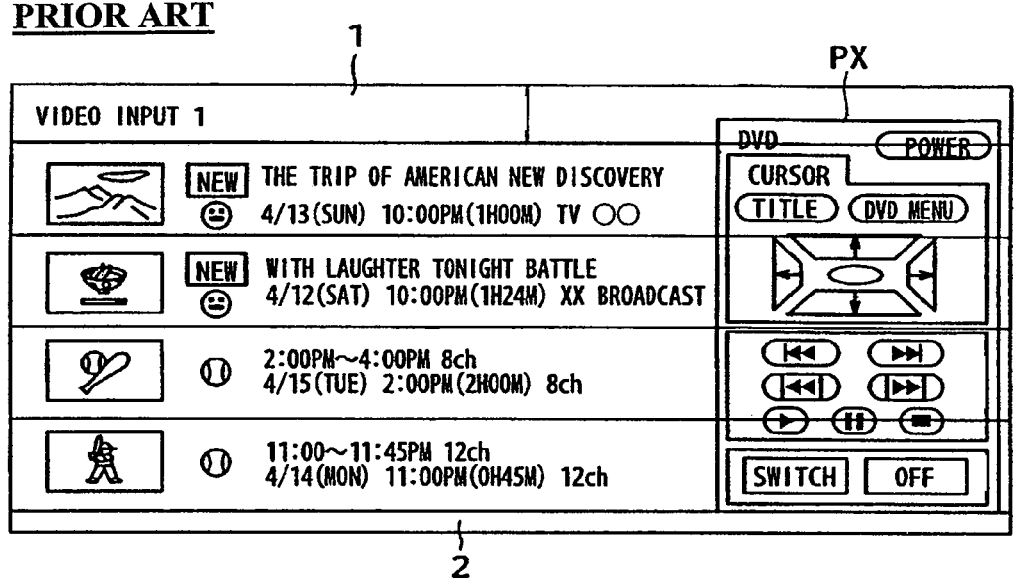
FIGS. 13A and 13B are diagrams for explaining a conventional display example in the case of displaying record history information and an EPG as well as a touch panel.
Figure 13B:
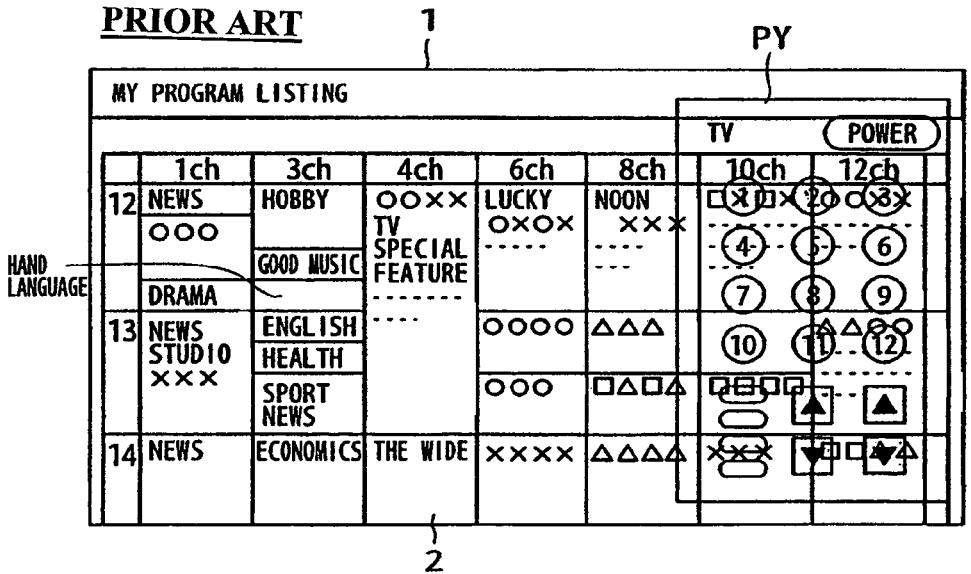

Also, in the case where a VTR, a DVD device or a hard disc device is connected to the base device 200, an image derived from the video signal from those devices is displayed on the LCD 108 of the display device 100 as the main display information as shown in FIG. 12A. In this case, when the control panel for the VTR or the DVD device is going to be displayed, the reproduced image which is the main display information is reduced in size and displayed, and the control panel CP1 for the VTR and the DVD device is displayed for conducting operation such as reproduction stop, pause, fast forwarding, or fast rewind, as shown in FIG. 12B.

Otherwise, in the case of displaying an image of the analog terrestrial broadband program from the base device 200, the control panel for the base device 200 and the image of the broadband program can be so displayed as not to overlap their display areas with each other, likewise.

The base device 200 can be connected with the DVD device, the VTR, the STB, the BS digital tuner that is called "IRD", various reproducing devices, or recording and reproducing devices such as a hard disk device, as described above. The image corresponding to the display signal of the information signal from those devices is displayed on the LCD 108 of the display device 100. In this event, the present invention can be applied to a case in which various control panels that are the operation display information are displayed.

Also, as understood from the above description, in the above embodiment, the transmitting and receiving antenna 101, the shared section 102 and the receiving processor 103 in the display device 100 cooperate with each other to realize the function of a receiving means. Also, the controller 130 and the OSD processor 106 realize the function of an operation display processing means, and the controller 130 and the size change processor 105 realize the function of a touch position detecting means. Further, the touch panel 121 and the coordinate detecting means 122 realize the function of a touch position detecting means, and the controller 130 realizes the function of a control means. In addition, the controller 130 realizes the function of a forming means for forming the remote control signal. The transmitting signal forming means 111, the transmitting processor 112, the shared section 102, and the transmitting and receiving antenna 101 cooperate with each other to realize the function of a transmitting means.

In the above embodiment, in the case of displaying the operation display information such as the control panel CP, the image derived from the video signal of the information signal that is supplied from the base device 200, or the display signal such as the text data is reduced in size. In this case, a reduction ratio can be variously adapted according to the size of the control panel to be displayed together. Accordingly, the reduction ratio can be made different between the longitudinal direction and the lateral direction.

Also, in the case of reducing the image that is derived from the video signal or the display signal such as the text data of the information signal supplied from the base device 200, a display position of the reduced image on the display screen can be adjusted. For example, it is possible to adjust the position of the main display information which is reduced at an arbitrary position on the display screen such as upper shift, lower shift or centering.

That is, the size change processor 105 of the display device 100 can change not only the change in the display size of the image but also the display position of the reduced image on the display screen.

Also, in this embodiment, when the user's finger repeatedly touches the touch panel other than the display area of the control panel, the control panels corresponding to the base device 200 and the respective external input devices which are connected to the base device 200 are subjected to rotation and displayed. However, the present invention is not limited to the above structure.

For example, switch icons of the control panels for the respective switchable devices may be disposed on the respective control panels so that the control panel for the intended device is displayed by operating the switch icon.

Also, as described above, the base device 200 includes the tuner 202, and the communication processor 220. However, the present invention is not limited to this structure. The base device 200 per se may have the function of a VTR, the function of a DVD, or the function of an STB or an IRD.

Also, the base device 200 may not provide the tuner 202 and the communication processor 220 as well as the function of a VTR, the function of a DVD, or the function of an STB or an IRD, but may merely receive a signal from the external input device and transmit the received signal by radio.

Also, the present invention is applicable to a display device unit having a storage device incorporated thereinto, which displays information from the storage device as the main display information, not depending on the information signal from the external. That is, the display device has a display element such as an LCD whose display screen is provided with a touch panel. The display device can display the information read from the storage device of the display device on the display element as the main display information, and display the control panel which is the operation display information for accepting the operation input from the user. In the display device thus structured, the size and the display position of the main display information can be changed so that the main display information and the operation display information do not overlap with each other.

Also, in the above mentioned embodiment, the display device 100 and the base device 200 are connected by a radio communication, the information signal from the external input device to the base device 200 is connected by wiring through a joining cable, and a remote control signal from the base device 200 to the external input device is connected by a radio communication using an infrared ray, between the base device 200 and the external input device. However, the present invention is not limited to the above structure.

The display device 100 and the base device 200 may be connected to each other by wiring, or the remote control signal from the base device 200 to the external input device can be transmitted by wiring. Also, the information signal and the remote control signal can be transmitted and received between the base device 200 and the external input device by a radio communication.

Also, the connection of the Internet can be conducted through a so-called broadband communication, or can be conducted through a LAN (local area network) such as a home network system.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A display device comprising:
    a coordinate-detector which detects a touch of a user on a display;
    a controller controlling display of a control panel and a main video signal received by a receiving processor on the display;
    a decoder decoding the main video signal to separate the main video signal into a digital video signal;
    a size changing device, receiving the main video signal output from the decoder, and reducing or enlarging a size of the main video signal in accordance with control signals of the controller, the size changing device reducing the size of the main video signal by thinning out digital video data of the main video signal and forming a reduced main video signal for display at a desired position on the display upon detection of a touch of the user to initiate display of the control panel, the size changing device enlarging the size of the main video signal by stopping the thinning out of the digital video data of the main video signal and forming an enlarged main video signal for display on the display upon detection of the touch of the user to erase the control panel from the display, and the size changing device reducing or enlarging the size of the main video signal by, respectively, thinning or stopping thinning of the digital video data of the main video signal upon detection of the touch of the user to display a new control panel different from a currently displayed control panel, thereby forming the reduced main video signal or the enlarged main video signal, respectively, to meet the size of the new control panel;
    a first processing device, connected to an output of the size changing device, the first processing device (a) forms a control panel video signal of a remote controller corresponding to the control panel, for controlling an external device, according to data supplied from the controller and (b) combines the reduced main video signal or the enlarged main video signal from the size changing device and the control panel video signal;
    a second processing device, connected to an output of the first processing device, which displays the combined reduced main video signal or enlarged main video signal and the control panel video signal received from the first processing device, wherein the reduced main video signal and the enlarged main signal do not overlap with the control panel video signal and the control panel video signal is displayed at a touch position based on the detection from the coordinate detector; and
    the controller specifies an operation key of the control panel, and the controller determines whether the specified operation key is intended for the external device.

2. The display device according to claim 1, wherein when the specified operation key is intended for the external device, the controller forms an operation signal according to the specified operation key, and then transmits the operation signal to the external device through a transmitting signals forming section, and when the specified operation key is not intended for the external device, the operation key to be processed in the display device and the controller determines whether the specified operation key instructs erasing of the control panel.

3. A two-way communication system comprising:
    a base device; and
    a display device including
        a coordinate-detector detects a touch of a user on a display;
        a controller controlling display of a control panel and a main video signal received by a receiving processor on the display;
        a decoder decoding the main video signal to separate the main video signal into a digital video signal;
        a size changing device, receiving the main video signal output from the decoder, and reducing or enlarging a size of the main video signal in accordance with control signals of the controller, the size changing device reducing the size of the main video signal by thinning out digital data of the main video signal and forming a reduced main video signal for display at a desired position on the display upon detection of a touch of the user to initiate display of the control panel, the size changing device enlarging the size of the main video signal by stopping the thinning out of the digital video data of the main video signal and forming an enlarged main video signal for display on the display upon detection of the touch of the user to erase the control panel from the display, and the size changing device reducing or enlarging the size of the main video signal by, respectively, thinning or stopping thinning of the digital video data of the main video signal upon detection of the touch of the user to display a new control panel different from a currently displayed control panel, thereby forming the reduced main video signal or the enlarged main video signal, respectively, to meet the size of the new control panel;
        a first processing device, connected to an output of the size changing device, the first processing device (a) forms a control panel video signal of a remote controller corresponding to the control panel, for controlling an external device, according to data supplied from the controller and (b) combines the reduced main video signal or the enlarged main video signal from the size changing device and the control panel video signal;
        a second processing device, connected to an output of the first processing device, displays the combined reduced main video signal or enlarged main video signal and a control panel video signal received from the first processing device, wherein the reduced main video signal and the enlarged main video signal do not overlap with the control panel video signal and the control panel video signal is displayed at a touch position based on the detection from the coordinate detector; and the controller specifies an operation key of the control panel, and the controller determines whether the specified operation key is intended for the base device.

4. The two-way communication system according to claim 3, wherein when the specified operation key is intended for the base device, the controller forms an operation signal according to the specified operation key, and then transmits the operation signal to the base device through a transmitting signals forming section, and when the specified operation key is not intended for the base device, the operation key to be processed in the display device and the controller determines whether the specified operation key instructs erasing of the control panel.

5. A display information method comprising the steps of:
   detecting a touch of a user on a display;
   controlling display of a control panel and a main video signal received by a receiving processor on the display;
   detecting the main video signal by a decoder to separate the main video signal into a digital video signal;
   reducing or enlarging a size of a main video signal in accordance with control signals by thinning out digital video data of the main video signal and forming a reduced main video signal for display at a desired position on the display upon detection of a touch of the user to initiate display of the control panel, wherein enlarging the size of the main video signal being by stopping the thinning out of the digital video data of the main video signal and forming an enlarged main video signal for display on the display upon detection of the touch of the user to erase the control panel from the display and reducing or enlarging the size of the main video signal by, respectively, thinning or stopping thinning of the digital video data of the main video signal upon detection of the touch of the user to display a new control panel different from a currently displayed control panel, thereby forming the reduce main video signal or the enlarged main video signal, respectively, to meet the size of the new control panel;
   forming a control panel video signal of a remote controller corresponding to the control panel, for controlling an external device, according to data supplied from a controller;
   combining the reduced main video signal or the enlarged main video signal and the control panel video signal;
   displaying the reduced main video signal or the enlarged main video signal and the control panel video signal, wherein the reduced main video signal or the enlarged main video signal do not overlap with the control panel video signal and the control panel video signal is displayed at a touch position based on the detection; and
   specifying an operation key of the control panel, and determining whether the specified operation key is intended for the external device.

6. The display information method according to claim 5, wherein when the specified operation key is intended for the external device, forming an operation signal according to the specified operation key, and then transmitting the operation signal to the external device and when the specified operation key is not intended for the external device, processing the operation key in the display device and determining whether the specified operation key instructs erasing of the control panel.

7. A non-transitory computer readable medium embodied with a computer program for a display device comprising the steps of:
   detecting a touch of a user on a display;
   controlling display of a control panel and a main video signal received by a receiving processor on the display;
   decoding the main video signal by a decoder to separate the main video signal into a digital video signal;
   reducing or enlarging the size of the main video signal in accordance with control signals by thinning out digital video data of the main video signal and forming a reduced main video signal for display at a desired position on the display upon detection of a touch of the user to initiate display of the control panel, wherein enlarging the size of the main video signal being by stopping the thinning out of the digital video data of the main video signal and forming an enlarged main video signal for display on the display upon detection of the touch of the user to erase the control panel from the display and reducing or enlarging the size of the main video signal by, respectively, thinning or stopping thinning of the digital video data of the main video signal upon detection of the touch of the user to display a new control panel different from a currently displayed control panel, thereby forming the reduce main video signal or the enlarged main video signal, respectively, to meet the size of the new control panel;
   forming a control panel video signal of a remote controller corresponding to the control panel, for controlling an external device, according to data supplied from a controller;
   combining the reduced main video signal or the enlarged main video signal and the control panel video signal;
   displaying the reduced main video signal or the enlarged main video signal and the control panel video signal, wherein the reduced main video signal or the enlarged main video signal do not overlap with the control panel video signal and the control panel video signal is displayed at a touch position based on the detection; and
   specifying an operation key of the control panel, and determining whether the specified operation key is intended for the external device.

8. The non-transitory computer readable medium according to claim 7, wherein when the specified operation key is intended for the external device, forming an operation signal according to the specified operation key, and then transmitting the operation signal to the external device, and when the specified operation key is not intended for the external device, processing the operation key in the display device and determining whether the specified operation key instructs erasing of the control panel.

* * * * *